(12) United States Patent  
Kato

(10) Patent No.: US 7,180,686 B2  
(45) Date of Patent: Feb. 20, 2007

(54) IMAGE PICKUP UNIT FOR ENDOSCOPE

(75) Inventor: Takayuki Kato, Aizuwakamatu (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/372,041

(22) Filed: Mar. 10, 2006

(65) Prior Publication Data

US 2006/0203361 A1    Sep. 14, 2006

(30) Foreign Application Priority Data

Mar. 10, 2005 (JP) ............................. 2005-066598

(51) Int. Cl.
*G02B 13/04* (2006.01)
(52) U.S. Cl. ................... 359/753; 359/749; 359/740; 359/771; 359/781; 359/782; 359/798
(58) Field of Classification Search ................ 359/740, 359/749–753, 793, 771, 781, 782, 798, 800
See application file for complete search history.

(56) References Cited

U.S. PATENT DOCUMENTS

| | | | | | |
|---|---|---|---|---|---|
| 4,403,837 | A | * | 9/1983 | Nakahashi | 359/770 |
| 4,764,001 | A | * | 8/1988 | Yokota | 359/740 |
| 5,198,931 | A | * | 3/1993 | Igarashi | 359/770 |
| 5,436,767 | A | * | 7/1995 | Suzuki et al. | 359/740 |
| 5,808,808 | A | * | 9/1998 | Yamanashi | 359/740 |
| 5,828,498 | A | * | 10/1998 | Sekiya et al. | 359/784 |
| 5,844,729 | A | * | 12/1998 | Shimizu | 359/781 |
| 5,999,327 | A | * | 12/1999 | Nagaoka | 359/793 |
| 6,016,229 | A | * | 1/2000 | Suzuki | 359/740 |
| 6,582,362 | B2 | * | 6/2003 | Konno | 359/656 |
| 2002/0057505 | A1 | * | 5/2002 | Sato | 359/753 |
| 2003/0103275 | A1 | * | 6/2003 | Sato | 359/749 |

FOREIGN PATENT DOCUMENTS

| | | |
|---|---|---|
| JP | 03-200911 | 9/1991 |
| JP | 04-275514 | 10/1992 |
| JP | 10-039206 | 2/1998 |
| JP | 2002-072085 | 3/2002 |
| JP | 2002-328299 | 11/2002 |

* cited by examiner

*Primary Examiner*—Evelyn A. Lester
(74) *Attorney, Agent, or Firm*—Kenyon & Kenyon LLP

(57) ABSTRACT

An image pickup unit which consists of an objective optical system and a solid-state image pickup device: the objective optical system being composed of a first negative lens unit comprising a first meniscus lens element having a convex surface on the object side and negative power, a second positive lens unit comprising a convex lens element and an aperture stop disposed between the first lens unit and the second lens unit and this image pickup unit having a small outside diameter, allowing a field angle to be changed little due to variations of parts and an assembling variation, and having a maximum field angle of 150° or larger.

18 Claims, 15 Drawing Sheets

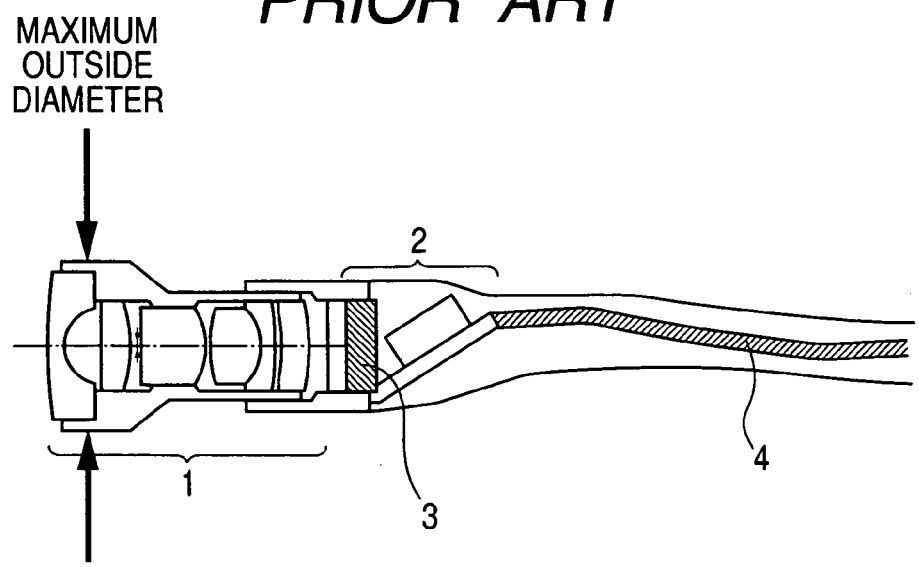
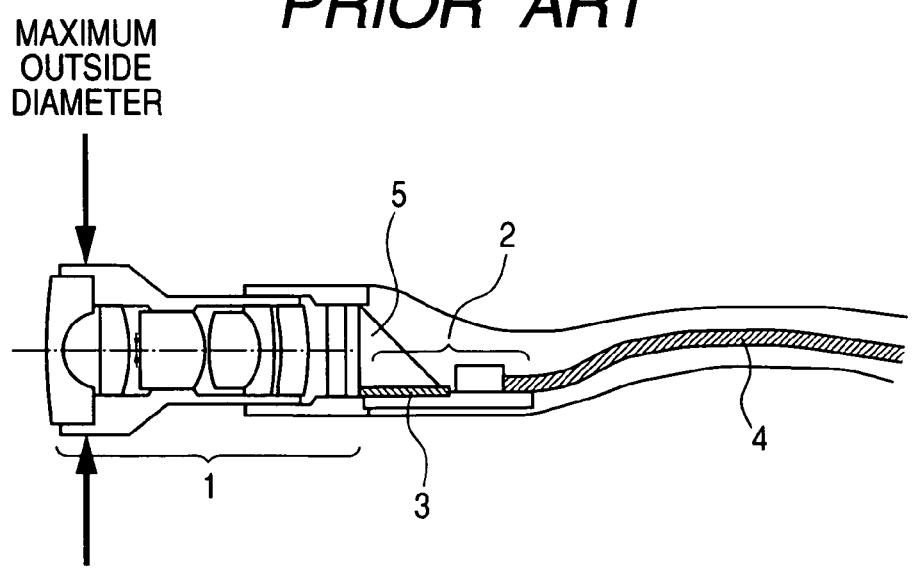

HORIZONTAL DIRECTION

IMAGE PICKUP UNIT FOR ENDOSCOPE

BACKGROUND OF THE INVENTION

1. Field of the Invention

The present invention relates to an image pickup unit for endoscope which consists of an objective optical system and a solid-state image pickup device, and has a maximum field angle of 150° or larger.

2. Description of the Prior Art

An electronic endoscope equipped with an image pickup unit which consists of an objective optical system and a solid-state image pickup device is used for observing a relatively narrow space such as an interior of a coelom.

For practical use of this electronic endoscope, an endoscope unit which has a relatively large field angle is used for facilitating to find out an abnormal matter such as a diseased portion.

In recent years, a medical endoscope, for example generally has a maximum field angle on the order of 90° to 140°. However, this medical endoscope requires a long time for observing the space such as an interior of the coelom without overlooking, thereby requiring a long inspection time.

In order to shorten this inspection time, the endoscope which has a larger field angle is required. A field angle of 150° or larger permits observing a wider range in a tubular coelom, therefore being preferable for shortening the inspection time.

Known as conventional examples of an objective optical system for endoscope which has a field angle of 150° or larger are described in literatures mentioned below:

Japanese Patent Kokai Publication No. Hei 3-200911
Japanese Patent Kokai Publication No. Hei 4-275514
Japanese Patent Kokai Publication No. Hei 10-39206
Japanese Patent Kokai Publication No. 2002 72085
Japanese Patent Kokai Publication No. 2002-328299

Out of these conventional examples, objective lens systems for endoscope having field angles of 150° or larger are described as seventh and eighth embodiments of Japanese Patent Kokai Publication No. Hei 3-200911 and a fifth embodiment of Japanese Patent Kokai Publication No. Hei 4-275514 respectively. However, these objective lens systems for endoscope have not been mass manufactured as commercial products.

Furthermore, lens systems which are not objective lens system for endoscope but have field angles of 150° and larger are described in the Japanese Patent Kokai Publication No. Hei 10-39206, Japanese Patent Kokai Publication No. 2002 72085 and Japanese Patent Kokai Publication No. 2002-328299. The lens systems described in these publications are lens systems which are to be used in still video cameras and monitor cameras.

An endoscope which has a maximum field angle on the order of 90° to 140° is problematic in that the endoscope requires complicated and a long time operations since the endoscope requires an operation to bend a tip of the endoscope for observing a reverse side of a fold, for example, when the endoscope is used for observing an object having a fold in a tubular coelom such as a colon.

The objective lens system described in the above-mentioned Japanese Patent Kokai Publication No. Hei 4-275514 is a lens system which consists of three lens components of four lens elements and is problematic in that the lens system can difficultly be manufactured stably since a change of a field angle of the lens system is remarkably influenced by manufacturing errors of the lens elements, manufacturing errors of a lens barrel and manufacturing errors at an assembling stage of an image pickup unit, the influences are remarkable in particular.

Furthermore, this objective lens system for endoscope is inconvenient for observation since the lens system remarkably distorts marginal portions of an image, thereby collapsing an image of an object at marginal portions.

On the other hand, the objective lens system described in the Japanese Patent Kokai Publication No. Hei 3-200911 produces little distortion and convenient for observing marginal portions of an image, but has too low a magnification at a center portion of the image. Therefore, this objective lens system does not permit observing an enlarged image of a portion which is to be observed in details. Furthermore, this objective lens system has a most object side surface which is remarkably protruding, whereby a lens element is easily damaged and can not drain water well.

Furthermore, each of the lens systems described in the Japanese Patent Kokai Publication No. Hei 10-39206 and Japanese Patent Kokai Publication No. 2002 72085 uses a most object side lens element which has an outside diameter remarkably larger than those of other lens elements. Therefore, an endoscope will have a form, for example, such as that shown in FIG. 1 or FIG. 2 when the lens system described in either of the publications is used an objective lens system for endoscope.

As apparent from these drawings, the most object side lens element has an outside diameter which is larger than that of an image pickup device as seen in a diametrical direction of an image pickup unit. When the lens system described in either of these conventional examples is used in an image pickup unit, the image pickup unit will be enlarged since a maximum outside diameter of an image pickup unit is determined by-an outside diameter of a most object side lens element.

Furthermore, aspherical surfaces are used in the lens systems described in Japanese Patent Kokai Publication No. Hei 3 200911, Japanese Patent Kokai Publication No. 2002-72085 and Japanese Patent Kokai Publication No. 2002-328299. These lens systems therefore require high precisions for the aspherical surfaces and will degrade image qualities if the aspherical surfaces are formed with low precisions. In addition, the aspherical surfaces which can hardly be worked with high precisions have low yields and require high manufacturing costs.

SUMMARY OF THE INVENTION

An object of the present invention is to provide an image pickup unit for endoscope which has good balance between a magnification at a center portion and that at a marginal portion of an image, a small outside diameter, a field angle which is changed little due to variations of parts and assembly, and a maximum field angle of 150° or larger.

Speaking concretely, an image pickup unit for endoscope which has a first composition according to the present invention comprises an objective optical system and a solid-state image pickup device, and is characterized in that the objective optical system comprises a first lens component which comprises a first meniscus lens element having a convex surface on the object side and has negative power, a second lens component which comprises at least a convex lens element and has a positive power as a whole, and an aperture stop which is disposed between the first lens component and the second lens component, satisfies conditions (1), (2) and (3) mentioned below and has a maximum field angle of 150° or larger.

$$0.7 < f/IH < 1 \quad (1)$$

$$-1.2 < f1/f < -0.7 \quad (2)$$

$$0.9 < D/|f1| < 1.8 \quad (3)$$

wherein a reference symbol f represents a focal length of the objective optical system, a reference symbol IH designates a maximum image height in a display area of the solid-state image pickup device, a reference symbol f1 denotes a focal length of the first lens component and a reference symbol D represents an equivalent air distance as measured along an optical axis from an image side surface of the first lens element to the aperture stop.

An image pickup unit for endoscope which has a second composition according to the present invention has the above described first composition and is characterized in that the objective optical system consists only of spherical lens elements and plane parallel plates, has the first lens element which is disposed on a most object side location, and satisfies the following conditions (4) and (5):

$$4f < r_1 < 12f \quad (4)$$

$$|LH| \leq IH \quad (5)$$

wherein a reference symbol $r_1$ represents a radius of curvature on a most object side surface of the first lens element and a reference symbol LH designates a distance which is measured from a principal ray to be incident at a maximum image height in a display area of the solid-state image pickup device to an optical axis on the most object side surface.

Another object of the present invention is provide an image pickup unit for endoscope which has a composition described below.

Speaking concretely, an image pickup unit for endoscope which has a third composition according to the present invention has a maximum field angle of 150° or larger and is characterized by satisfying the following condition (6):

$$0.68 < IH2/IH1 < 0.76 \quad (6)$$

wherein a reference symbol IH1 represents an image height of a ray which is incident on the objective optical system in a direction of 75° relative to an optical axis and a reference symbol IH2 designates an image height of a ray which is incident on the objective optical system in a direction of 50° relative to the optical axis.

BRIEF DESCRIPTION OF THE DRAWINGS

FIG. 1 is a sectional view showing a composition of a conventional image pickup unit for endoscope;

FIG. 2 is a sectional view showing a composition of another conventional image pickup unit for endoscope;

DETAILED DESCRIPTION OF THE PREFERRED EMBODIMENTS

An image pickup unit for endoscope which has a first composition according to the present invention consists of an objective optical system and a solid-state image pickup device, and is characterized in that the objective optical system comprising a first lens unit which comprises a first lens element having a convex surface on the object side and having negative power; and has negative refractive power as a whole, a second lens unit which comprises at least a convex lens element and has positive power as a whole, and an aperture stop which is disposed between the first lens unit and the second lens unit, satisfies conditions (1), (2) and (3) which are mentioned below, and has a maximum field angle of 150° or larger.

$$0.7 < f/IH < 1 \quad (1)$$

$$-1.2 < f1/f < -0.7 \quad (2)$$

$$0.9 < D/|f1| < 1.8 \quad (3)$$

wherein a reference symbol f represents a focal length of the objective optical system, a reference symbol IH designates a maximum image height in a display area of the solid state image pickup device, a reference symbol f1 denotes a focal length of the first lens unit and a reference symbol D represents an equivalent air distance as measured along an optical axis from an image side surface of the first lens element in the first lens unit to the aperture stop.

Figure 5:
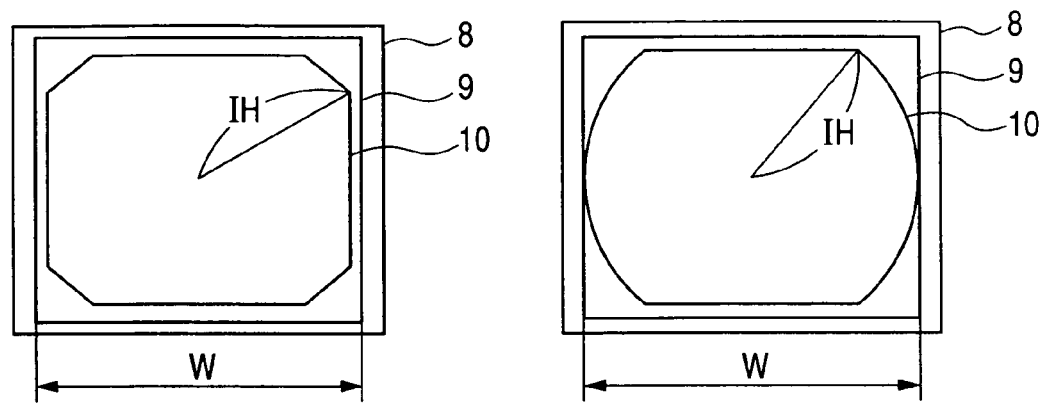
FIG. 5 is a diagram descriptive of areas, a maximum image height IH and a horizontal length W on a solid-state image pickup device.

The condition (1) defines a relation between the focal length of the objective optical system and the maximum image height. The maximum image height IH is shown in FIG. 5. If f/IH has a value which is smaller than a lower limit of 0.7 of the condition (1), the first lens element will have a large outside diameter and a magnification will be low at a center portion, thereby making it impossible to accomplish the object of the present invention. If f/IH has a value which is larger than an upper limit of 1 of the condition (1), in contrast, it will be difficult to obtain a maximum field angle larger than 150°.

The condition (2) defines a power to be distributed to the first lens unit of the objective optical system.

Since the objective optical system for the image pickup unit according to the present invention is to have a super-wide field angle of 150° or larger, it is necessary to distribute relatively strong negative power to the first lens unit for obtaining a field angle which is wide as described above. When the first lens unit has negative power too strong relative to the power of the optical system as a whole, however, a field angle and a declination are remarkably changed dependently on a form and a location of the first lens unit which are varied due to manufacturing errors.

The condition (2) has been adopted for a reason described above. If f1/f has a value which is larger than an upper limit of −0.7 of the condition (2), the first lens unit will have too strong power and optical performance will be influenced remarkably by variations of a form and the like of the lens element, thereby making it difficult to manufacturing the lens elements stably.

If f1/f has a value which is smaller than a lower limit of −1.2 of the condition (2), in contrast, the first lens element will have a large outside diameter and a most object side lens surface will remarkably protrude, whereby the lens element will be easily damaged and problematic in cleanability.

The condition (3) defines a positional relation between the first lens unit (the first lens element) and the aperture stop.

If D/|f1| has a value which is smaller than a lower limit of 0.9 of the condition (3), the objective optical system will have a low magnification at a marginal portion, whereby an image will not be legible, a field angle will be remarkably changed due to variations of parts and assembly, whereby stable production will be difficult. If D/|f1| has a value which is larger than an upper limit of 1.8 of the condition (3), in contrast, the first lens element (a most object side lens element) will have a large outside diameter and the objective optical system will have a low magnification at a center portion, thereby making it impossible to accomplish the object of the present invention.

It is desirable for the image pickup unit according to the present invention to compose the second lens unit of the objective optical system of a front unit which comprises at least a convex lens element and has positive refractive power as a whole, and a rear unit which comprises at least a cemented lens component. By composing the second lens unit as described above, it is possible to favorably correct longitudinal chromatic aberration, lateral chromatic aberration and curvature of field.

The above described composition provides an effect to obtain the image pickup unit according to the present invention which has a field angle of 150° or larger, properly balances between a magnification at a center portion and a marginal portion of the field angle with a relatively small number of spherical lens elements, has a small outside diameter and allows the field angle to be changed little due to variations of parts and assembly.

Furthermore, the objective optical system which is to be used in the image pickup unit according to the present invention can be configured as an optical system which has a compact composition consisting of four lens elements as a whole and favorably corrected aberrations by composing the first lens unit of a meniscus lens which has a convex surface on the object side and has negative refractive power, composing the front unit in the second lens unit of a plano-convex lens which has a planar surface on the object side or a meniscus lens which has a concave surface on the object side, and positive refractive power, and composing the rear unit in the second lens unit of a cemented lens which has positive refractive power as a whole.

Alternately, it is possible to compose the image pickup unit of a smaller number of parts by configuring the front unit in the second lens unit of the above described objective optical system as a cemented lens component consisting of a plane parallel plate on which an aperture stop is deposited or a plane parallel plate which consists of a filter for correcting a color tone or a filter for cutting off a laser beam and the like, and a plano-convex lens element having a planar surface on the object side.

Furthermore, an image pickup unit for endoscope which has a next second composition is also capable of accomplishing the object of the present invention.

This image pickup unit is characterized in that an objective optical system is composed only of spherical lens elements and plane parallel plates, has a first lens element disposed at a most object side location, and satisfies the following conditions (4) and (5):

$$4f < r_1 < 12f \tag{4}$$

$$|LH| \leq IH \tag{5}$$

wherein a reference symbol $r_1$ represents a radius of curvature on a most object side surface of the first lens element, a reference symbol LH designates a distance as measured from a principal ray to be incident at a maximum image height in a display area of a solid-state image pickup device to an optical axis on a most object side surface.

Out of the above-mentioned conditions, the condition (4) defines a shape of a convex surface which is a most object side surface of the first lens element. If $r_1$ has a value which is smaller than a lower limit of 4f of the condition (4), the lens surface will remarkably protrude, whereby the lens element will be easily damaged, cannot drain water favorably and poses a problem of cleanability. Furthermore, a magnification will be low at a center portion, whereby it will be inconvenient to observe an enlarged image of a region which is found to be observed detailedly. If $r_1$ has a value which is larger than an upper limit of 12f of the condition (4), in contrast, marginal portions of an image of an object will be collapsed due to remarkable distortion at the marginal portions and hardly observable.

The condition (5) defines passages for rays which are to pass through the optical system. So far as |LH| has a value which is within a range satisfying the condition (5), an outside diameter of a tip of an insert portion of an endoscope can be relatively small since a maximum outside diameter of an endoscope is determined by a size of the solid-state image pickup device in a direction of a diameter of the image pickup unit. If |LH| has a value which is not within the range defined by the condition (5), the image pickup unit will have an outside diameter which is prolonged dependently on an outside diameter of the first lens element, thereby making it difficult to realize an endoscope which has a small outside diameter.

The second composition according to the present invention of which the objective optical system is configured so as to satisfy the conditions (4) and (5), thereby obtaining the image pickup unit which has the maximum field angle of 150° or larger, is excellent in cleanability and water drainage, has the lens surface which is hardly damaged, properly balances magnifications between a center and marginal portions of an image, and has a small outside diameter.

Figure 4:
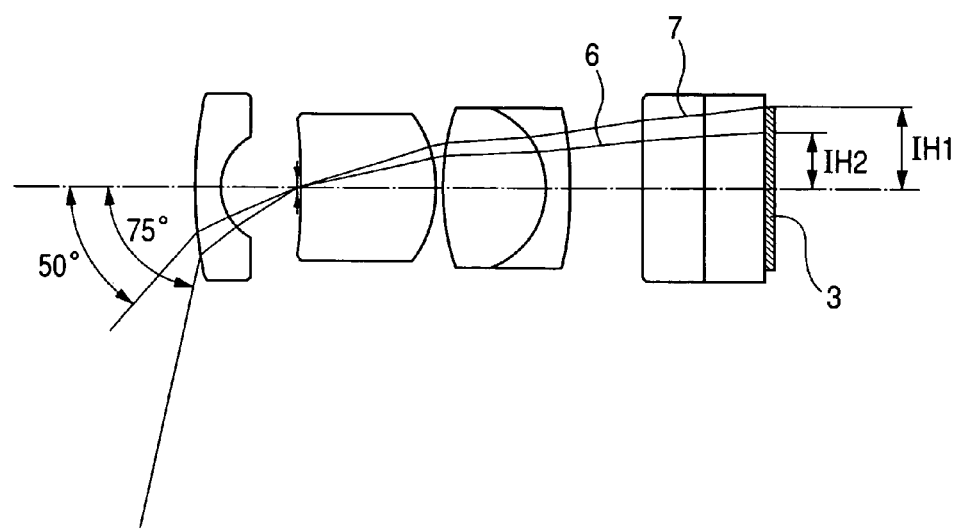
FIG. 4 is a sectional view descriptive of an image heights IH1 and IH2 in the image pickup unit according to the present invention.

Furthermore, it is desirable for accomplishing the object of the present invention to compose the image pickup unit for endoscope according to the present invention as described below:

Speaking concretely, an image pickup unit for endoscope which has a third composition according to the present invention has a maximum field angle of 150° or larger and is characterized by satisfying the following condition (6):

$$0.68 < IH2/IH1 < 0.76 \quad (6)$$

wherein a reference symbol IH1 represents an image height of a ray which is incident on an objective optical system in a direction at 75° relative to an optical axis and a reference symbol IH2 designates an image height of a ray which is incident on the objective optical system in a direction at 50° relative to the optical axis as shown in FIG. 4.

The condition (6) defines a ratio between image heights of rays which are incident on the objective optical system in the directions at the angles of 75° and 50° respectively relative to the optical axis, or a magnification at a center of an image and distortion at a marginal portion of the image which are suited for observation through an endoscope using an image pickup unit which has a maximum field angles of 150° or larger.

An endoscope which is equipped with an image pickup unit which has a maximum field angle of 150° or larger like the image pickup unit according to the present invention is used while being operated so that a portion of an object which is captured at a screening time is located at a center of a visual field and brought near for observation in details.

For obtaining an effect of a wide field angle like that of the image pickup unit according to the present invention which is larger than that of the conventional endoscope, it is considered necessary to obtain a maximum field angle on the order of 150° (half field angle of 75°) or larger and an area for close observation within 100° (half field angle of 50°).

For proper balance between magnifications at a center portion and a marginal portion of an image, it is therefore effective to select an adequate ratio between a visual range up to the half field angle of 50° and a visual range up to the half field angle of 75°.

If IH2/IH1 has a value which is larger than an upper limit of 0.76 of the condition (6), an image of an object will be collapsed at marginal portions of the image, thereby being hardly observable at the marginal portions. If IH2/IH1 has a value which is smaller than a lower limit of 0.68 of the condition (6), the marginal portions of the image of the object will be legible, but a magnification at the center portion will be too low, thereby making it difficult to observe an enlarged image in details.

So far as IH2/IH1 has a value which is within a range of the condition (6), the balance between the magnifications at the center portion and the marginal portion of the image will be favorably maintained, an image will easily be observable in a broad region ranging to marginal portions at the screening time and a magnification which is not too low makes it possible to observe an enlarged image closely and detailedly.

In this case, it is desirable that a difference $\Delta DT$ between distortion at the image height IH1 and distortion at an image height 0.95×IH1 satisfies the following condition:

$$-12 < \Delta DT < -8$$

$\Delta DT$ defined by the above-mentioned condition corresponds to a degree of a variation of distortion in the vicinity of the maximum image height.

If $\Delta DT$ has a value which is smaller than a lower limit of −12 of this condition, an image of an object will be collapsed at marginal portion of the image, thereby being inconvenient for observation. Furthermore, a field angle will be changed remarkably due to variations of parts and an assembly, thereby making it difficult to produce the image pickup unit stably. If $\Delta DT$ has a value which is larger than an upper limit of −8 of the above-mentioned condition, observation of marginal portions of an image will be facilitated, but a magnification will be too low at a center portion, thereby making it difficult to enlarge an image for detailed observation.

For the image pickup unit which has the above described second or third composition, it is desirable that the objective optical system is composed, like the objective optical system of the image pickup unit which has the first composition, of a first lens unit which comprises a first meniscus lens element having a convex surface on the object side and negative power and has negative refractive power as a whole, a second lens unit which comprises at least a convex lens element and positive refractive power as a whole, and an aperture stop which is disposed between the first lens unit and the second lens unit.

Furthermore, a cemented lens unit which consists of a plane parallel plate and a plano-convex lens element may be disposed in the second lens unit.

When a color solid-state image pickup device on which a color filter is disposed for each picture element is arranged is to be used as the solid-state image pickup device in the image pickup unit which has the first, second or third composition, it is desirable that the solid-state image pickup device shown in FIG. 5 satisfies the following conditions (7), (8) and (9):

$$W/p > 500 \quad (7)$$

$$240 < f/p < 480 \quad (8)$$

$$2400 \times p < Fno. < 4200 \times p \quad (9)$$

wherein a reference symbol W represents a horizontal length of an effective image pickup area of the solid-state image pickup device shown in FIG. 5, a reference symbol p designates a horizontal pitch of the picture elements on the solid-state image pickup device and a reference symbol Fno. denotes an F number of the objective optical system.

The above-mentioned conditions (7), (8) and (9) have been adopted for obtaining favorable observation performance by increasing a depth of field and enhancing resolution when the objective optical system is combined with the solid-state image pickup device on which the color filter is arranged for each picture element in the above described image pickup unit configured to maintain the good balance between the magnification at the center portion and that at the marginal portion of the image.

Even in case of an image pickup unit for endoscope which is configured to maintain good balance between a magnification at a center portion and that at a marginal portion of an image as described above, an attempt to obtain a wide field angle will cause moderate distortion of the marginal portion, thereby making a magnification at the marginal portion lower than that at the center portion. Use of a solid-state image pickup device which satisfies the condition (7) makes it possible to obtain a highly precise image even in a distorted area.

If W/p has a value smaller than an lower limit of 500 of the condition (7), it will be difficult to obtain a highly precise image.

Furthermore, it is possible to increase a depth of field of an objective optical system by combining a solid-state image pickup device which satisfies the condition (7) and on which a color filter is arranged for each picture element with an objective optical system which satisfies the above mentioned conditions (8) and (9).

If f/p has a value larger than an upper limit of 480 of the condition (8), the picture elements will have a pitch too narrow for the focal length, thereby decreasing a depth of field. Accordingly, a sufficient magnification or resolution will not be obtained at a near point or a distant view will be out of focus.

If f/p has a value smaller than a lower limit 240 of the condition (8), the picture element will be have a pitch too wide for the focal length, thereby making it impossible to obtain a highly precise image.

Furthermore, if Fno. has a value larger than an upper limit of 4200×p of the condition (9), the objective lens system will have too large an F number, thereby making it impossible to obtain a sharp image under an influence due to light diffraction.

If Fno. has a value smaller than a lower limit of 2400×p of the condition (9), in contrast, the-objective optical system will have too small an F number, thereby decreasing a depth of field. Accordingly, a sufficient magnification or resolution will not be obtained at a near point or a distant view will be out of focus.

When a solid-state image pickup device which generates a luminance signal for each picture element is to be used as the solid-state image pickup device of the image pickup unit which has the first, second or third composition according to the present invention, it is desirable to satisfy the following conditions (10), (11) and (12):

$$W/p > 340 \quad (10)$$

$$160 < f/p < 320 \quad (11)$$

$$1600 \times p < Fno. < 2800 \times p \quad (12)$$

wherein a reference symbol W represents a horizontal length of an effective image pickup area of the solid-state image pickup device shown in FIG. 5, a reference symbol p designates a horizontal pitch of picture elements on the solid-state image pickup device and a reference symbol Fno. denotes an effective F number of the objective optical system.

The above-mentioned conditions are required for increasing a depth of field and enhancing resolution so as to obtain a more favorable observing condition by defining a combination of an objective optical system with a solid state image pickup unit which generates a luminance signal for each picture element in the above described image pickup unit for endoscope in which the good balance is maintained between the magnification at the center portion and that at the marginal portion of the image.

When the image pickup unit for endoscope according to the present invention in which the good balance is maintained between the magnification at the center portion and that at the marginal portion of the image has a large field angle, an image is adequately distorted in a marginal area and a magnification at the marginal portion is lower than that at the center portion.

When the above-mentioned condition (10) is satisfied, it is possible to obtain a highly precise image even in the above described distorted area.

If W/p has a value smaller than a lower limit of 340 of the condition (10), it will be difficult to obtain a highly precise image in the above described distorted area.

It is possible to increase a depth of field of the image pickup unit by combining a solid-state image pickup device which is configured so as to satisfy the condition (10) with an objective optical system which is configured so as to satisfy the conditions (11) and (12).

If f/p has a value larger than an upper limit of 320 of the condition (11), picture elements will have a pitch too small for a focal length, whereby-the objective optical system will have a small depth of field. Accordingly, it will be impossible to obtain a sufficient magnification or resolution at a near point or a distant view will be out of focus.

If f/p has a value smaller than a lower limit of 160 of the condition (11), picture elements will have a pitch too wide for a focal length, thereby making it impossible to obtain a highly precise image.

Furthermore, if Fno. has a value larger than an upper limit of 2800×p of the condition (12), the objective optical system will have too large an F number, thereby making it impossible to obtain a sharp image under an influence due to light diffraction. If Fno. has a value smaller than a lower limit of 1600×p of the condition (12), in contrast, the objective optical system will have too small an F number, thereby decreasing a depth of field. Accordingly, a sufficient magnification or resolution cannot be obtained at a near point or a distance view will be out of focus.

Though the image pickup unit for endoscope using the solid-state image pickup device which generates the luminance signal for each picture element processes an image by a little different method, it is empirically allowed to regard a state that an MTF of 10 to 30% or higher on an optical axis at a spatial frequency corresponding to two picture elements on the solid-state image pickup device is obtained as a focused state.

It is general that a depth of field of an optical system is larger as a focal length is shorter and a focal length is shorter as a field angle is wider.

An image pickup unit which has a field angle exceeding 150° has a depth of field which is larger than that of an image pickup unit which has an ordinary field angle on the order of 90° to 140°.

The above-mentioned conditions (11) and (12) exhibit effects for an image pickup unit which has such a wide field angle, or make it possible to realize an image pickup unit for endoscope which exhibits an effect to observe an object at a short distance of 4 mm or shorter and has a depth of field sufficient for an object at a distance on the order of 100 mm or longer.

Figure 6:
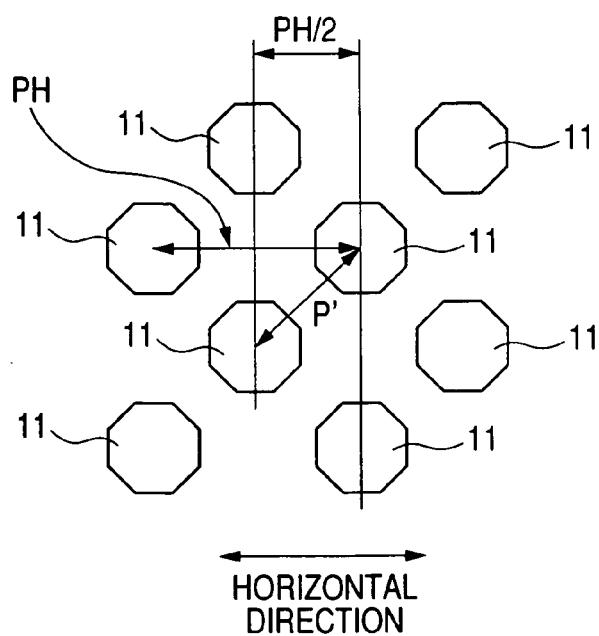
FIG. 6 is a diagram descriptive of a solid-state image pickup device on which picture elements are arranged at locations along horizontal lines which are alternately shifted ½ pitch in a horizontal direction.

In addition, there is available in these days a solid-state image pickup device on which picture elements are arranged at a pitch PH at locations along horizontal lines which are alternately shifted PH/2 as shown in FIG. 6.

Such a solid-state image pickup device generates a luminance signal by a method different from one used by a conventional solid-state image pickup device on which picture elements are arranged vertically and horizontally in a shape of lattice. In other words, it has been reported that the former image pickup device outputs picture signals with resolution which is 1.6 times as high as that of the conventional solid-state image pickup device on which the picture elements are arranged vertically and horizontally in the shape of lattice {Magazine of Japan Academic Society of Photography vol, 63, No. 3, pp 1–5 (2000)}.

When an oblique pitch of picture elements is denoted by p' in FIG. 6 and a value of p is calculated by a formula mentioned below, the above described solid-state image pickup device is applicable as the solid-state image pickup device on which the color filter is arranged for each picture element in the image pickup unit which has the above described first, second or third composition according to the present invention and satisfies the above-mentioned condition (7) or the conditions (7), (8) and (9) or as the solid state image pickup device which generates the luminance signal for each picture element in the image pickup unit which satisfies the conditions (8) and (9) or the conditions (8), (9) and (10).

$$p = p' \times \sqrt{1.6}$$

In case of the so-called three plate type image pickup unit which generates an image signal using three solid-state image pickup devices, a light bundle from an object is split into three beams which are allocated to the three solid-state image pickup devices corresponding to the three primary colors R, G and B. Each of the solid-state image pickup devices generates a signal of a color corresponding to each picture element. A luminance signal and a color signal are obtained from three R luminance signal, G luminance signal and B luminance signal. Since the solid-state image pickup devices of the three color signals can be regarded as equivalent to the luminance signal generated for each picture element, the three image pickup devices are applicable as the image pickup device in the image pickup unit according to the present invention.

For the image pickup unit for endoscope which has each composition according to the present invention, it is desirable to use a material which has a refractive index of 2.0 or higher for the e-line (having a wavelength of 546.0 nm) as a material of a most object side lens element (first lens element) of the objective optical system.

The first lens element of the objective optical system used in the image pickup unit according to the present invention has strong refractive power and a function to widen a field angle. An optical material which has a higher refractive index generally has stronger light bending power. Accordingly, as the first lens element has a higher refractive index, the objective optical system used in the image pickup unit according to the present invention is capable of allowing a radius of curvature to be larger on a most object side lens surface, thereby being more advantageous from viewpoints of resistance to damage, water drainage, cleanability and the like. By heightening a refractive index of the first lens element, it is further possible to maintain required power of the most object side surface without reducing a radius of curvature on this surface, thereby lowering heights of rays and reducing an outside diameter of the lens element.

When the most object side surface of the objective optical system used in the image pickup unit according to the present invention is a convex surface, the surface is more disadvantageous than a planar surface from a viewpoint of resistance to damage. It is desirable for correcting this defect to select for the first lens element of the objective optical system a crystalline material such as sapphire or a light transmissive ceramic material which has high hardness, high resistance to injury and a high refractive index.

The image pickup unit for endoscope according to the present invention has a field angle of 150° or larger and therefore permits observing a broad range at a time. Furthermore, the image pickup unit according to the present invention can be composed only of lens elements in a small number of 3 to 5 without using an aspherical surface and configured thin since the objective optical system has an outside diameter which is not larger than a size of the solid-state image pickup device in a diametrical direction of the image pickup unit. Furthermore, the image pickup unit according to the present invention facilitates to observe a broad range at a screening time and can maintain a required magnification at a center portion of an image owing to the good balance between the magnification at the center portion and that at the marginal portion of the image, permits detailed observation of an enlarged image obtained at a position close to an object owing to the large depth of field, allows a field angle to be changed little due to variations of parts and an assembly, can be manufactured stably, and provides effects of excellent cleanability, favorably water drainage, high resistance to injury and the like.

Figure 3:
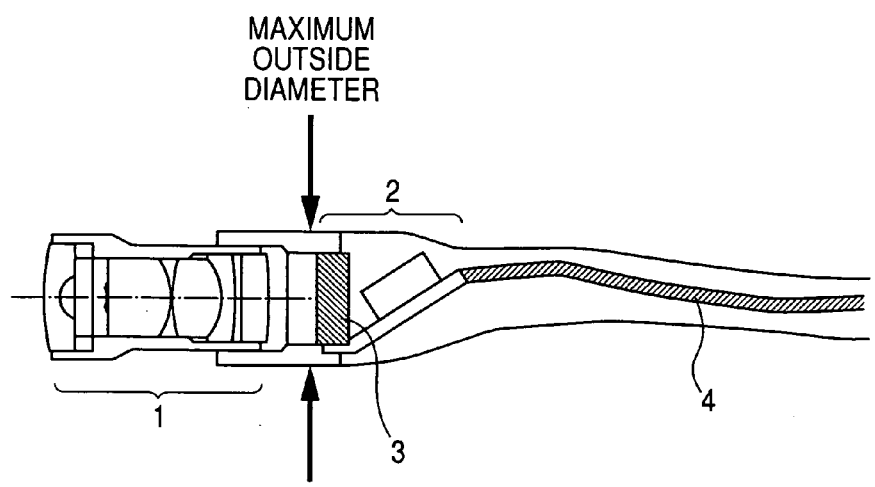
FIG. 3 is a sectional view showing a composition of an image pickup unit according to the present invention.

An embodiment of the image pickup unit for endoscope according to the present invention has a composition shown in FIG. 3, in which a reference numeral 1 represents an objective optical system, a reference numeral 2 designates a solid-state image pickup device, a reference numeral 3 denotes a light receiving surface of the solid-state image pickup device and a reference numeral 4 represents a cable.

Now, description will be made of embodiments of the present invention.

A first embodiment of the image pickup unit for endoscope according to the present invention has a composition shown in FIG. 7 in which an objective optical system having numerical data which is listed below is combined with a solid-state image pickup device on which a color filter is arranged for each picture element.

IH=1.2 mm, 2ω=165.6°, f=1.005 mm, fI=−1.102 mm
r1=7.135 mm, D=1.582 mm, LH=1.159 mm, IH1=1.138 mm IH2=0.839 mm, W=2.200 mm, Fno.=9.237, p=0.0025 mm

| | | | |
|---|---|---|---|
| $r_1$ = 7.135 | $d_1$ = 0.36 | $n_1$ = 1.88815 | $v_1$ = 40.76 |
| $r_2$ = 0.84 | $d_2$ = 0.52 | | |
| $r_3$ = ∞ | $d_3$ = 0.4 | $n_2$ = 1.52498 | $v_2$ = 59.89 |
| $r_4$ = ∞ | $d_4$ = 0.8 | | |
| $r_5$ = ∞ (stop) | $d_5$ = 0.03 | | |
| $r_6$ = ∞ | $d_6$ = 1.88 | $n_3$ = 1.88815 | $v_3$ = 40.76 |
| $r_7$ = −1.972 | $d_7$ = 0.09 | | |
| $r_8$ = 4.925 | $d_8$ = 1.45 | $n_4$ = 1.73234 | $v_4$ = 54.68 |
| $r_9$ = −1.446 | $d_9$ = 0.36 | $n_5$ = 1.93429 | $v_5$ = 18.9 |
| $r_{10}$ = −8.728 | $d_{10}$ = 0.09 | | |
| $r_{11}$ = ∞ | $d_{11}$ = 0.5 | $n_6$ = 1.51965 | $v_6$ = 75 |
| $r_{12}$ = ∞ | $d_{12}$ = 0.83 | | |
| $r_{13}$ = ∞ | $d_{13}$ = 0.9 | $n_7$ = 1.51825 | $v_7$ = 64.14 |
| $r_{14}$ = ∞ | $d_{14}$ = 0.9 | $n_8$ = 1.61379 | $v_8$ = 50.2 |
| $r_{15}$ = ∞ | $d_{15}$ = 0 | | | wherein a reference symbol IH represents a maximum image height, a reference symbol 2ω designates a field angle and a reference symbol f denotes a focal length of the objective optical system. Furthermore, reference symbols $r_1$, $r_2$, . . . represent radii of curvature on surfaces of respective lens elements, reference symbols $d_1$, $d_2$, . . . designate thicknesses of the respective lens elements and airspaces reserved therebetween, reference symbols $n_1$, $n_2$, . . . denote refractive indices of the respective lens elements for the e-line (having a wavelength of 546.1 nm), and reference symbols $v_1$, $v_2$, . . . represent Abbe's numbers of the respective lens elements for the d-line. In addition, lengths such as f, r and d are specified in a unit of millimeter.

Figure 7:
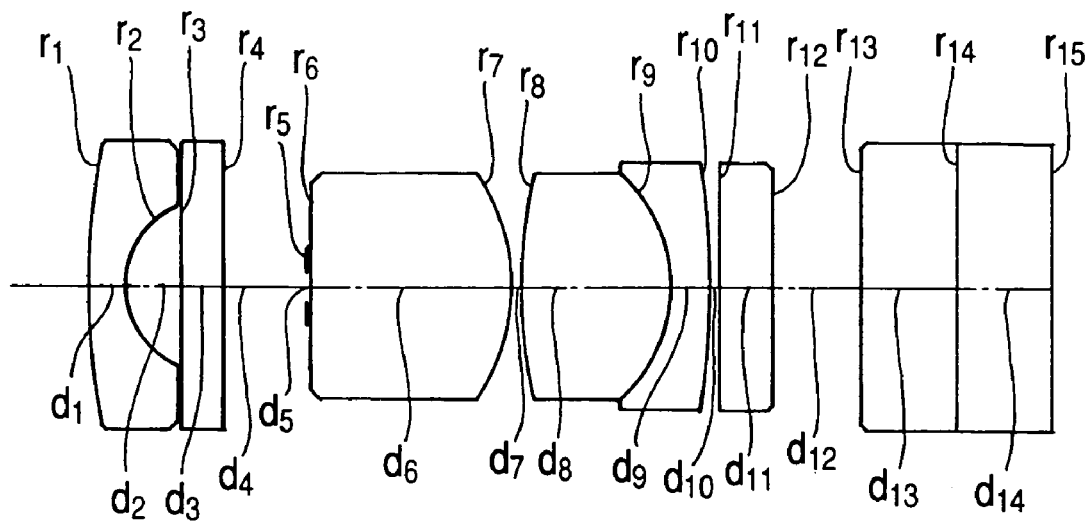
FIG. 7 is a sectional view of an objective optical system according to a first embodiment of the present invention.

An optical system according to the first embodiment consists, as shown in FIG. 7, of a first lens unit composed of a negative meniscus lens element ($r_1$ to $r_2$) which has a convex surface on the object side and is arranged as a first lens element, and a second lens unit composed of a plano convex lens element ($r_6$ to $r_7$) and a cemented lens component consisting of a biconvex lens element ($r_8$ to $r_9$) and a negative meniscus lens element ($r_9$ to $r_{10}$); an aperture stop ($r_5$) being disposed so as to be in contact with an object side surface of the plano-convex lens element in the second lens unit.

Furthermore, a-color solid-state image pickup deice on which color filters are arranged is disposed in a condition cemented to an image side surface ($r_{15}$) of a plane parallel plate which is disposed on a most image side location.

A plane parallel plate ($r_3$ to $r_4$) which is disposed between the first lens unit and the second lens unit (between the first lens unit and the aperture stop) is a filter for cutting off a laser beam, a plane parallel plate ($r_{11}$ to $r_{12}$) which is disposed on the image side of the second lens unit is a filter for correcting a color tone, a plane parallel plate ($r_{14}$ to $r_{15}$) which is disposed on the most image side is a cover glass plate cemented to an image pickup surface of the above described solid-state image pickup device, and a plane parallel plate ($r_{13}$ to $r_{14}$) which is disposed on the object side of the cover glass plate is a filter for protecting the solid-state image pickup device.

In the first embodiment, the objective optical system has a composition corresponding to the first, second or third composition according to the present invention and satisfies the conditions (1), (2), (3), (4), (5) and (6) as shown in Table 1. Furthermore, the first embodiment is an example which uses a color solid-state image pickup device on which a color filter is arranged for each picture element.

Furthermore, the objective optical system in the first embodiment is composed of three lens elements all of which are spherical lens elements and an extremely simple optical system.

The image pickup unit according to the first embodiment satisfies the conditions (7), (8) and (9) as shown in Table 1, and has a large depth of field of 3 to 10 mm. When this image pickup unit is used in a medical endoscope, for example, the image pickup unit permits observing a broad range at a time, therefore being advantageous for shortening an inspection time. Furthermore, the image pickup unit according to the first embodiment permits observing an enlarged image of a diseased area by observations from close positions.

An image pickup unit according to a second embodiment has a composition shown in FIG. 8 and numerical data which is listed below. Furthermore, the image pickup unit according to the second embodiment has a composition in which an objective optical system is combined with a solid-state image pickup device which generates a luminance signal for each picture element.

IH=0.9 mm, 2ω=160.1°, f=0.783 mm, fI=−0.795 mm r1=5.948 mm, D=0.962 mm, LH=0.867 mm, IH1=0.869 mm IH2=0.642 mm, W=1.548 mm, Fno.=5.440, p=0.003 mm

Figure 8:
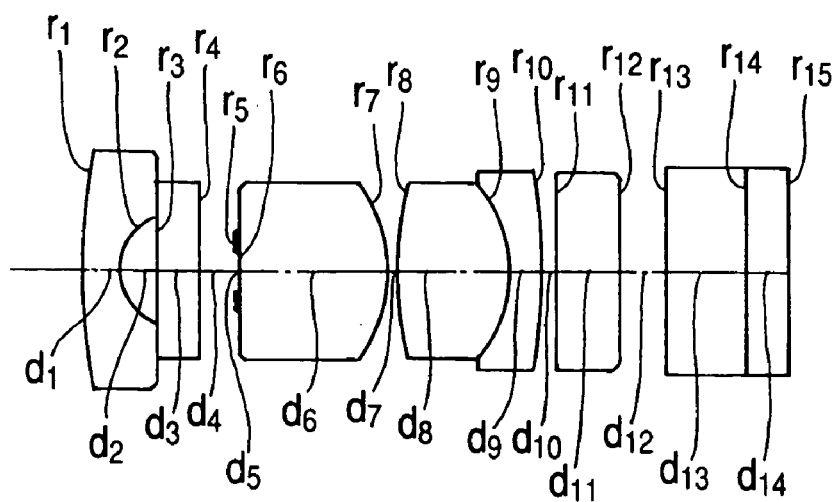
FIG. 8 is a sectional view of an objective optical system according to a second embodiment of the present invention.

The image pickup unit for endoscope according to the second embodiment also consists, as shown in FIG. 8, of an objective optical system which is composed of a first lens unit composed of a negative meniscus lens element ($r_1$ to $r_2$) disposed as a first lens element, a second lens unit composed of a plano convex lens element ($r_6$ to $r_7$) and a cemented lens component consisting of a biconvex lens element ($r_8$ to $r_9$) and a negative meniscus lens element ($r_9$ to $r_{10}$), and an aperture stop ($r_5$) disposed between the first lens unit and the second lens unit so as to be in contact with an object side surface of the plano-convex lens element in the second lens unit, and a solid-state image pickup device which is cemented to an image side surface of a cover glass plate disposed on the most image side, or an image pickup surface of the objective optical system, and generates a luminance signal for each picture element.

Furthermore, a plane parallel plate ($r_3$ to $r_4$) which is disposed between the first lens element and the aperture stop is a filter for cutting off a laser beam, a plane parallel plate ($r_{11}$ to $r_{12}$) which is disposed on the image side of the second lens unit is a filer for correcting a color tone, and two plane parallel plate ($r_{13}$ to $r_{15}$) which are disposed on the most image side are cover glass plate respectively.

The image pickup unit according to the second embodiment corresponds to the first, second or third composition according to the present invention, and satisfies the conditions (1), (2), (3), (4), (5) and (6) as shown in Table 1. Used as a solid-state image pickup device of the image pickup unit according to the second embodiment is the solid-state image pickup device which generates the luminance signal for each picture element. The image pickup unit according to the second embodiment therefore satisfies the conditions (8), (9), (10), (11) and (12) as shown in Table 1.

Furthermore, the image pickup unit according to the second embodiment is a simple optical system which is composed only of spherical lens elements in a small number of four.

Furthermore, the image pickup unit according to the second embodiment uses sapphire as a glass material of the first lens element and has a most object side surface which is hard and can hardly be damaged.

An image pickup unit according to a third embodiment has a composition shown in FIG. 9 and has numerical data which is listed below. A solid-state image pickup device used in the image pickup unit according to the third embodiment is a color solid-state image pickup device on which a color filter is arranged for each picture element.

IH=1.4 mm, 2ω=161.5°, f=1.229 mm, fI=−1.015 mm r1=10.400 mm, D=1.652 mm, LH=1.039 mm, IH1=1.352 mm IH2=1.016 mm, W=2.519 mm, Fno.=8.923, p=0.0034 mm

| | | | |
|---|---|---|---|
| $r_1$ = 5.948 | $d_1$ = 0.35 | $n_1$ = 1.77066 | $v_1$ = 71.79 |
| $r_2$ = 0.541 | $d_2$ = 0.36 | | |
| $r_3$ = ∞ | $d_3$ = 0.4 | $n_2$ = 1.52498 | $v_2$ = 59.89 |
| $r_4$ = ∞ | $d_4$ = 0.34 | | |
| $r_5$ = ∞ (stop) | $d_5$ = 0.03 | | |
| $r_6$ = ∞ | $d_6$ = 1.4 | $n_3$ = 1.88815 | $v_3$ = 40.76 |
| $r_7$ = −1.427 | $d_7$ = 0.08 | | |
| $r_8$ = 3.701 | $d_8$ = 1.09 | $n_4$ = 1.73234 | $v_4$ = 54.68 |
| $r_9$ = −1.265 | $d_9$ = 0.3 | $n_5$ = 1.93429 | $v_5$ = 18.9 |
| $r_{10}$ = −6.184 | $d_{10}$ = 0.14 | | |
| $r_{11}$ = ∞ | $d_{11}$ = 0.6 | $n_6$ = 1.51965 | $v_6$ = 75 |
| $r_{12}$ = ∞ | $d_{12}$ = 0.43 | | |
| $r_{13}$ = ∞ | $d_{13}$ = 0.75 | $n_7$ = 1.51825 | $v_7$ = 64.14 |
| $r_{14}$ = ∞ | $d_{14}$ = 0.4 | $n_8$ = 1.6135 | $v_8$ = 50.2 |
| $r_{15}$ = ∞ | $d_{15}$ = 0 | | |

| | | | |
|---|---|---|---|
| $r_1$ = 10.4 | $d_1$ = 0.416 | $n_1$ = 2.08841 | $v_1$ = 30.4 |
| $r_2$ = 0.978 | $d_2$ = 0.6 | | |
| $r_3$ = ∞ | $d_3$ = 0.4 | $n_2$ = 1.52498 | $v_2$ = 59.89 |
| $r_4$ = ∞ | $d_4$ = 0.79 | | |
| $r_5$ = ∞ (stop) | $d_5$ = 0.03 | | |
| $r_6$ = ∞ | $d_6$ = 0.5 | $n_3$ = 1.51825 | $v_3$ = 64.14 |
| $r_7$ = ∞ | $d_7$ = 1.6 | $n_4$ = 1.88815 | $v_4$ = 40.76 |
| $r_8$ = −2.214 | $d_8$ = 0.104 | | |
| $r_9$ = 6.933 | $d_9$ = 1.556 | $n_5$ = 1.73234 | $v_5$ = 54.68 |
| $r_{10}$ = −1.511 | $d_{10}$ = 0.416 | $n_6$ = 1.93429 | $v_6$ = 18.9 |
| $r_{11}$ = −9.673 | $d_{11}$ = 2.33 | | |
| $r_{12}$ = ∞ | $d_{12}$ = 1 | $n_7$ = 1.51825 | $v_7$ = 64.14 |
| $r_{13}$ = ∞ | $d_{13}$ = 1 | $n_8$ = 1.61379 | $v_8$ = 50.2 |
| $r_{14}$ = ∞ | $d_{14}$ = 0 | | |

Figure 9:
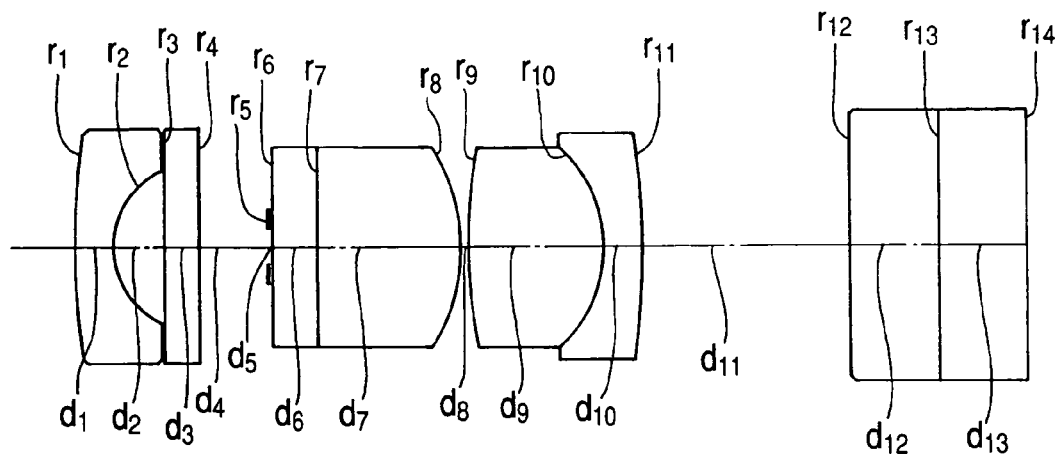
FIG. 9 is a sectional view of an objective optical system according to a third embodiment of the present invention.

The image pickup unit according to the third embodiment consists, as shown in FIG. 9, of an objective optical system which consists of a first lens unit composed of a negative meniscus lens element ($r_1$ to $r_2$) having a convex surface on the object side and disposed as a first lens element, a second lens unit composed of a cemented lens component consisting of a plane parallel plate ($r_6$ to $r_7$) and a plano-convex lens element ($r_7$ to $r_8$), and a cemented lens component consisting of a biconvex lens element ($r_9$ to $r_{10}$) and a negative meniscus lens element ($r_{10}$ to $r_{11}$) and having positive refractive power as a whole, and a stop ($r_5$) disposed between the first lens unit and the second lens unit so as to be in contact with the plane parallel plate in the second lens unit, and a color solid-state image pickup device which is cemented to an image side surface of a cover glass plate ($r_{13}$ to $r_{14}$) and on which a filter is arranged for each picture element.

Furthermore, a plane parallel plate ($r_3$ to $r_4$) which is disposed on the image side of the first lens element is a filter for cutting off a laser beam, a plane parallel plate ($r_{13}$ to $r_{14}$) which is disposed on the most image side is a cover glass plate cemented to an image pickup surface of the solid-state image pickup device and a plane parallel plate ($r_{12}$ to $r_{13}$) which is disposed on the object side of the cover glass plate is a cover glass plate for protecting the solid-state image pickup device.

The image pickup unit according to the third embodiment corresponds to each of the first through the third compositions according to the present invention, and satisfies the conditions (1), (2), (3), (4), (5) and (6).

Used as a solid-state image pickup device of the third embodiment is the color solid-state image pickup device on which the color filter is arranged for each picture element. The image pickup unit according to the third embodiment therefore satisfies the conditions (7), (8) and (9) as shown in Table 1.

Furthermore, the first lens unit of the objective optical system according to the third embodiment is composed of one meniscus lens element having the convex surface on the object side and made of a glass material which has a high refractive index of 2.08841.

An image pickup unit according to a fourth embodiment of the present invention has a composition shown in FIG. 10 and numerical data which is listed below.

The image pickup unit according to the fourth embodiment has a composition using a solid-state image pickup device which generates a luminance signal for each picture element and is disposed on an image surface of an objective optical system.

IH=0.784 mm, 2ω=154.9°, f=0.680 mm, fl=−0.781 mm r1=5.280 mm, D=0.874 mm, LH=0.750 mm, IH1=0.770 mm IH2=0.566 mm, W=1.552 mm, Fno.=7.268, p=0.0041 mm

| $r_1$ = 5.28 | $d_1$ = 0.27 | $n_1$ = 1.77066 | $v_1$ = 71.79 |
|---|---|---|---|
| $r_2$ = 0.528 | $d_2$ = 0.58 | | |
| $r_3$ = ∞ | $d_3$ = 0.44 | $n_2$ = 1.49557 | $v_2$ = 75 |
| $r_4$ = ∞ | $d_4$ = 0 | | |
| $r_5$ = ∞ (stop) | $d_5$ = 0.05 | | |
| $r_6$ = −2.395 | $d_6$ = 0.722 | $n_3$ = 1.88815 | $v_3$ = 40.76 |
| $r_7$ = −0.805 | $d_7$ = 0.044 | | |
| $r_8$ = ∞ | $d_8$ = 0.598 | $n_4$ = 1.73234 | $v_4$ = 54.68 |
| $r_9$ = −0.86 | $d_9$ = 0.22 | $n_5$ = 1.9343 | $v_5$ = 18.9 |
| $r_{10}$ = −2.589 | $d_{10}$ = 0.05 | | |
| $r_{11}$ = ∞ | $d_{11}$ = 0.45 | $n_6$ = 1.49557 | $v_6$ = 75 |
| $r_{12}$ = ∞ | $d_{12}$ = 0.79 | | |
| $r_{13}$ = ∞ | $d_{13}$ = 0.6 | $n_7$ = 1.88815 | $v_7$ = 40.76 |
| $r_{14}$ = ∞ | $d_{14}$ = 0.4 | $n_8$ = 1.61379 | $v_8$ = 50.2 |
| $r_{15}$ = ∞ | $d_{15}$ = 0 | | |

Figure 10:
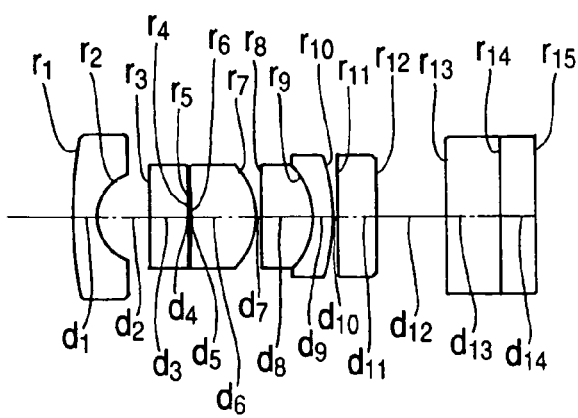
FIG. 10 is a sectional view of an objective optical system according to a fourth-embodiment of the present invention.

The image pickup unit according to the fourth embodiment has a composition in which an objective optical system which consists, as shown in FIG. 10, of a first lens unit composed of a meniscus sapphire lens element ($r_1$ to $r_2$) having a convex surface on the object side, a second lens unit composed of a positive meniscus lens element ($r_6$ to $r_7$) having a convex surface on the image side and a cemented lens component consisting of a plano convex lens element ($r_8$ to $r_9$) and a meniscus lens element ($r_9$ to $r_{10}$) and having positive refractive power as a whole, and an aperture stop ($r_5$) disposed in contact with an object side surface of the meniscus lens element in the second lens unit, and is combined with a solid-state image pickup device which is cemented to an object side surface of a cover glass plate ($r_{14}$ to $r_{15}$).

Furthermore, a plane parallel plate ($r_3$ to $r_4$) which is disposed between the first lens unit and the second lens unit (between the first lens unit and the aperture stop) is a filter for cutting off a laser beam, and a plane parallel plate ($r_{11}$ to $r_{12}$) which is disposed on the image side of the second lens unit is a filter for correcting a color tone. Furthermore, a plane parallel plate ($r_{14}$ to $r_{15}$) which is disposed on the most image side is a cover glass plate cemented to an image pickup surface of the solid-state image pickup device and a plane parallel plate which is disposed on the object side of the cover glass plate is a cover glass plate for protecting the solid-state image pickup device.

The image pickup unit according to the fourth embodiment corresponds to each of the first through the third compositions according to the present invention or is an image pickup unit for endoscope which has a solid-state image pickup device which generates a luminance signal for each picture element. The image pickup unit according-to the fourth embodiment therefore satisfies the conditions (10), (11) and (12) as apparent from the Table 1.

Furthermore, all the lens elements of the objective optical system of the image pickup unit according to the fourth embodiment are spherical lens elements.

Since the fourth embodiment also uses sapphire as a glass material for the first lens element, a most object side surface which protrudes on the object side is hard and can hardly be damaged.

An image pickup unit according to a fifth embodiment of the present invention has a composition shown in FIG. 11 and numerical data which is listed below. Furthermore, the image pickup unit according to the fifth embodiment has a composition in which an objective optical system is combined with a solid-state image pickup device on which a color filter is arranged for each picture element.

IH=1.207 mm, 2ω=156.7°, f=1.048 mm, fl=−1.252 mm r1=8.360 mm, D=1.471 mm, LH=1.044 mm, IH1=1.179 mm IH2=0.874 mm, W=2.052 mm, Fno.=9.050, p=0.003 mm

| $r_1$ = 8.36 | $d_1$ = 0.36 | $n_1$ = 1.88815 | $v_1$ = 40.76 |
|---|---|---|---|
| $r_2$ = 0.83 | $d_2$ = 0.86 | | |
| $r_3$ = ∞ | $d_3$ = 0.7 | $n_2$ = 1.51825 | $v_2$ = 64.14 |
| $r_4$ = −8.04 | $d_4$ = 0.15 | | |

-continued

| | | | |
|---|---|---|---|
| $r_5 = \infty$ (stop) | $d_5 = 0.03$ | | |
| $r_6 = \infty$ | $d_6 = 1.89$ | $n_3 = 1.88815$ | $v_3 = 40.76$ |
| $r_7 = -2.04$ | $d_7 = 0.09$ | | |
| $r_8 = 4.95$ | $d_8 = 1.46$ | $n_4 = 1.73234$ | $v_4 = 54.68$ |
| $r_9 = -1.455$ | $d_9 = 0.36$ | $n_5 = 1.93429$ | $v_5 = 18.9$ |
| $r_{10} = -8.78$ | $d_{10} = 0.09$ | | |
| $r_{11} = \infty$ | $d_{11} = 0.5$ | $n_6 = 1.51965$ | $v_6 = 75$ |
| $r_{12} = \infty$ | $d_{12} = 0.78$ | | |
| $r_{13} = \infty$ | $d_{13} = 1$ | $n_7 = 1.51825$ | $v_7 = 64.14$ |
| $r_{14} = \infty$ | $d_{14} = 0.8$ | $n_8 = 1.61379$ | $v_8 = 50.2$ |
| $r_{15} = \infty$ | $d_{15} = 0$ | | |

Figure 11:
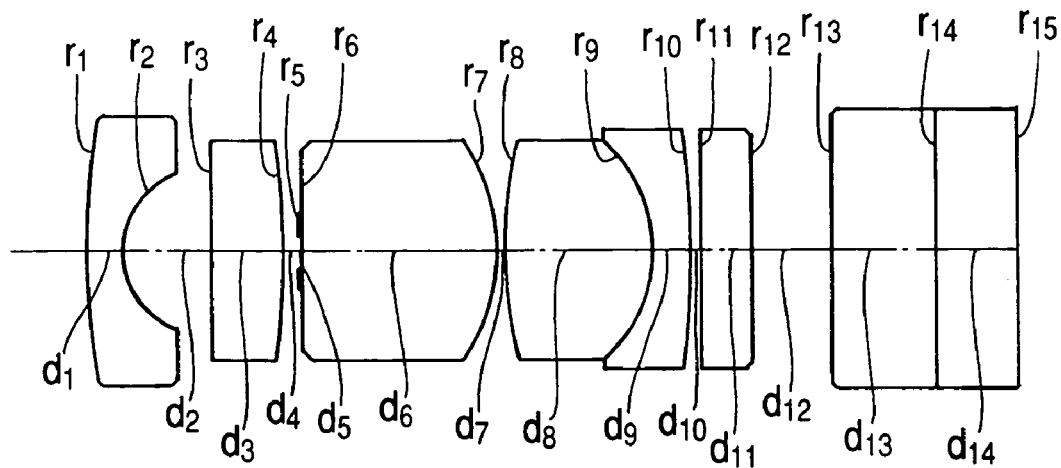
FIG. 11 is a sectional view of an objective optical system according to a fifth embodiment of the present invention.

The image pickup unit according to the fifth embodiment consists, as shown in FIG. 11, of an objective optical system consisting of a first lens unit composed of two lens elements, or a meniscus lens element ($r_1$ to $r_2$) having a convex surface on the object side and a plano-convex lens element ($r_3$ to $r_4$), a second lens unit which is composed of a plano-convex lens element ($r_6$ to $r_7$), and a cemented lens component consisting of a biconvex lens element ($r_8$ to $r_9$) and a negative meniscus lens element ($r_9$ to $r_{10}$) and has positive refractive power as a whole, and an aperture stop ($r_5$) which is disposed in contact with an object side surface of the plano convex lens element in the second lens unit, and a solid-state image pickup device disposed on the image side of the objective optical system. A plane parallel plate ($r_{11}$ to $r_{12}$) which is disposed on the image side of the second lens unit is a filter for correcting a color tone, a plane parallel plate ($r_{14}$ to $r_{15}$) which is disposed on the most image side is a cover glass plate having an image surface to which the color solid-state image pickup device is cemented, and a plane parallel plate ($r_{13}$ to $r_{14}$) which is disposed on the object side of the cover glass plate is a cover glass plate for protecting the solid-state image pickup device.

The image pickup unit according to the fifth embodiment also corresponds to each of the first through the third compositions according to the present invention. This image pickup unit therefore satisfies the conditions (1), (2), (3), (4), (5) and (6).

Furthermore, the fifth embodiment is an example which uses a color solid-state image pickup device on which a color filter is arranged for each picture element. The image pickup unit according to the fifth embodiment therefore satisfies the conditions (7), (8) and (9) as shown in Table 1.

Though the image pickup unit according to the fifth embodiment uses the lens elements in a number of five which is larger than a number of the lens elements which are used in each of the other embodiments, a lens element having positive power which is added in the first lens unit makes it possible to weaken refractive power of the positive lens element which is disposed on the object side in the second lens unit and apt to have relatively strong refractive power in the objective optical system of the image pickup unit according to the present invention. It is therefore possible to reduce changes of a field angle and a declination due to variations in forms and manufacturing variations of the lens elements.

An image pickup unit according to a sixth embodiment has a composition shown in FIG. 12 and numerical data which is listed below. The image pickup unit according to this embodiment has a composition in which an objective optical system is combined with a color image pickup device on which a color filter is arranged for each picture element.

IH=1.2 mm, 2ω=150.4°, f=1.110 mm, fI=−0.885 mm r1=13.200 mm, D=1.172 mm, LH=0.834 mm, IH1=1.199 mm IH2=0.910 mm, W=2.120 mm, Fno.=9.790, p=0.004 mm

| | | | |
|---|---|---|---|
| $r_1 = 13.2$ | $d_1 = 0.36$ | $n_1 = 1.88815$ | $v_1 = 40.76$ |
| $r_2 = 0.732$ | $d_2 = 0.5$ | | |
| $r_3 = \infty$ | $d_3 = 0.4$ | $n_2 = 1.52498$ | $v_2 = 59.89$ |
| $r_4 = \infty$ | $d_4 = 0.41$ | | |
| $r_5 = \infty$ (stop) | $d_5 = 0.03$ | | |
| $r_6 = \infty$ | $d_6 = 2$ | $n_3 = 1.88815$ | $v_3 = 40.76$ |
| $r_7 = -2.183$ | $d_7 = 0.09$ | | |
| $r_8 = 3.884$ | $d_8 = 1.55$ | $n_4 = 1.73234$ | $v_4 = 54.68$ |
| $r_9 = -1.284$ | $d_9 = 0.36$ | $n_5 = 1.93429$ | $v_5 = 18.9$ |
| $r_{10} = -6.924$ | $d_{10} = 1.85$ | | |
| $r_{11} = \infty$ | $d_{11} = 0.9$ | $n_6 = 1.51825$ | $v_6 = 64.14$ |
| $r_{12} = \infty$ | $d_{12} = 0.9$ | $n_7 = 1.61379$ | $v_7 = 50.2$ |
| $r_{13} = \infty$ | $d_{13} = 0$ | | |

Figure 12:
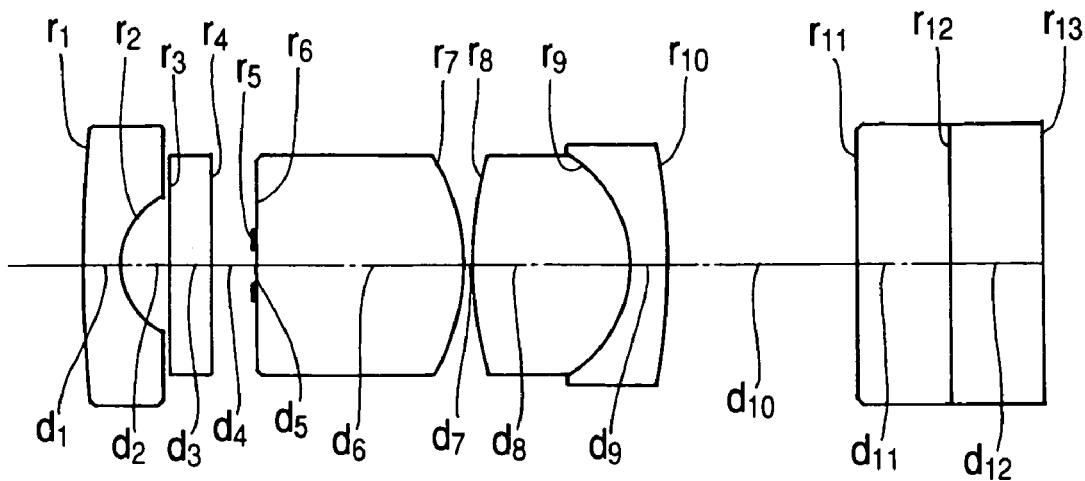
FIG. 12 is a sectional view of an objective optical system according to a sixth embodiment of the present invention.

In the sixth embodiment, the objective optical system is composed, as shown in FIG. 12, of a first lens unit which is composed of a meniscus lens element ($r_1$ to $r_2$) having a convex surface on the object side, and a second lens unit which is composed of a plano-convex lens element ($r_6$ to $r_7$) and a cemented lens component consisting of a biconvex lens element ($r_8$ to $r_9$) and a negative meniscus lens element ($r_9$ to $r_{10}$), and has positive refractive power as a whole. Furthermore, disposed in this objective optical system is an aperture stop ($r_5$) which is disposed between the first lens unit and the second lens unit so as to be in contact with an object side surface of the plano-convex lens element in the second lens unit.

Furthermore, a plane parallel plate ($r_3$ to $r_4$) which is disposed between the first lens unit and the second lens unit is a filter for cutting off a laser beam, a plane parallel plate ($r_{12}$ to $r_{13}$) which is disposed on the most image side is a cover glass plate cemented to an image pickup surface of a solid-stage image pickup device, and a plane parallel plate ($r_{11}$ to $r_{12}$) which is disposed on the object side of the cover glass plate is a cover glass plate for protecting the solid-state image pickup device.

The image pickup unit according to the sixth embodiment also corresponds to each of the first through the third compositions according to the present invention and satisfies the conditions (1), (2), (3), (4), (5) and (6).

Furthermore, the solid state image pickup device used in the sixth embodiment is the color solid-state image pickup device on which a color filter is arranged for each picture element as in the fifth embodiment and the image pickup unit according to the sixth embodiment satisfies the conditions (7), (8) and (9) as shown in Table 1.

In the sixth embodiment, all the lens elements of the objective optical system are spherical lens elements.

The image pickup unit according to the sixth embodiment has a large radius of curvature on a most object side surface so that this surface has an excellent cleanability, a favorable water draining property and high resistance to damage.

An image pickup unit according to a seventh embodiment has a composition shown in FIG. 13 in which an objective optical system is combined with a color solid-state image pickup device on which a color filter is arranged for each picture element and numerical data which is listed below:

IH=1.2 mm, 2ω=170.3°, f=0.937 mm, fI=−0.994 mm r1=4.440 mm, D=1.220 mm, LH=1.120 mm, IH1=1.103 mm IH2=0.789 mm, W=2.111 mm, Fno.=7.723, p=0.0028 mm

| | | | |
|---|---|---|---|
| $r_1 = 4.44$ | $d_1 = 0.36$ | $n_1 = 1.88815$ | $\nu_1 = 40.76$ |
| $r_2 = 0.708$ | $d_2 = 1.22$ | | |
| $r_3 = \infty$ (stop) | $d_3 = 0.03$ | | |
| $r_4 = \infty$ | $d_4 = 2.17$ | $n_2 = 1.88815$ | $\nu_2 = 40.76$ |
| $r_5 = -1.737$ | $d_5 = 0.09$ | | |
| $r_6 = 6.531$ | $d_6 = 1.44$ | $n_3 = 1.73234$ | $\nu_3 = 54.68$ |
| $r_7 = -1.373$ | $d_7 = 0.36$ | $n_4 = 1.93429$ | $\nu_4 = 18.9$ |
| $r_8 = -6.433$ | $d_8 = 1.07$ | | |
| $r_9 = \infty$ | $d_9 = 0.9$ | $n_5 = 1.51825$ | $\nu_5 = 64.14$ |
| $r_{10} = \infty$ | $d_{10} = 0.9$ | $n_6 = 1.61379$ | $\nu_6 = 50.2$ |
| $r_{11} = \infty$ | $d_{11} = 0$ | | |

Figure 13:
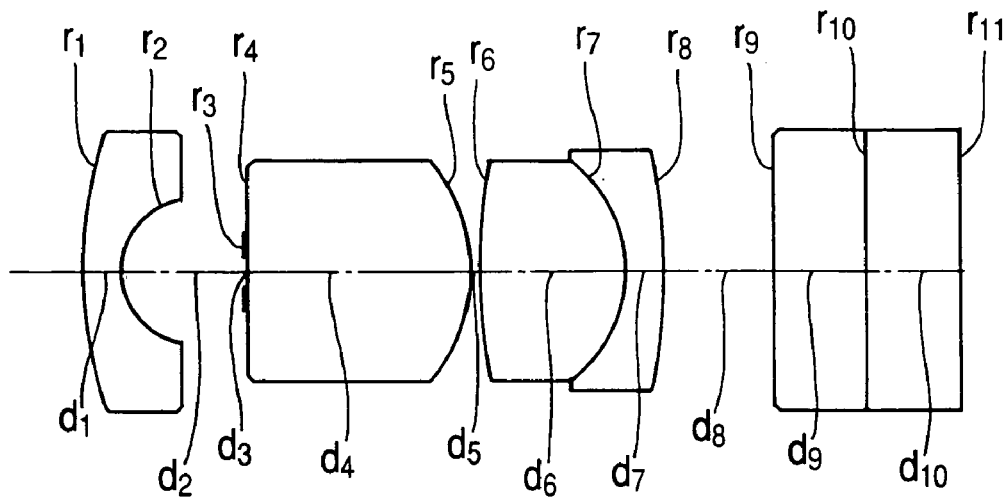
FIG. 13 is a sectional view of an objective optical system according to a seventh embodiment of the present invention.

The image pickup unit according to the seventh embodiment consists, as shown in FIG. 13, of a combination of an objective optical system for endoscope consisting of a first lens unit which is composed of a meniscus lens element ($r_1$ to $r_2$) having a convex surface on the object side, and a second lens unit which is composed of a plano convex lens element ($r_4$ to $r_5$), and a cemented lens component consisting of a biconvex lens element ($r_6$ to $r_7$) and a negative meniscus lens element ($r_7$ to $r_8$), and has positive refractive power as s whole, and a color solid state image pickup device which is disposed at an image surface of the objective optical system.

Furthermore, the objective optical system comprises an aperture stop ($r_3$) which is disposed between the first lens unit and the second lens unit so as to be in contact with an object side surface of the plano-convex lens element in the second lens unit.

Furthermore, a plane parallel plate ($r_{10}$ to $r_{11}$) which is disposed on the most object side is a cover glass plate cemented to the solid-state image pickup device and a plane parallel plate ($r_9$ to $r_{10}$) which is disposed on the object side of the cover glass plate is a cover glass plate for protecting the solid-state image pickup device.

The seventh embodiment also corresponds to each of the first through the third compositions according to the present invention, and satisfies the conditions (1), (2), (3), (4), (5) and (6).

Furthermore, the solid-state image pickup device used in the seventh embodiment is the color image pickup device on which the color filter is arranged for each picture element. The image pickup unit according to the seventh embodiment therefore satisfies the conditions (7), (8) and (9).

All the lens elements used for composing the objective optical system in the image pickup unit according to the seventh embodiment are spherical lens elements.

Though the image pickup unit according to the seventh embodiment is a little disadvantageous in a cleanability, a water draining property and resistance to damaged due to a relatively small radius of curvature selected for a most object side surface ($r_1$) of the objective optical system, this image pickup unit has a composition which little distorts marginal portions of an image and is suited for cases where importance is placed on observations of the marginal portions.

An image pickup unit according to an eighth embodiment has a composition shown in FIG. 14 and numerical data which is listed below. This image pickup unit consists of a combination of an objective optical system and a solid-state image pickup device which generates a luminance signal for each picture element at an image location of the objective optical system.

IH=1.2 mm, 2ω=155.7°, f=1.042 mm, fI=−1.166 mm r1=7.000 mm, D=1.130 mm, LH=1.006 mm, IH1=1.174 mm IH2=0.865 mm, W=2.016 mm, Fno.=7.690, p=0.0036 mm

| | | | |
|---|---|---|---|
| $r_1 = 7$ | $d_1 = 0.36$ | $n_1 = 1.88815$ | $\nu_1 = 40.76$ |
| $r_2 = 0.88$ | $d_2 = 1.13$ | | |
| $r_3 = \infty$ (stop) | $d_3 = 0.05$ | | |
| $r_4 = -11$ | $d_4 = 2$ | $n_2 = 1.88815$ | $\nu_2 = 40.76$ |
| $r_5 = -1.85$ | $d_5 = 0.09$ | | |
| $r_6 = 3.884$ | $d_6 = 1.55$ | $n_3 = 1.73234$ | $\nu_3 = 54.68$ |
| $r_7 = -1.284$ | $d_7 = 0.36$ | $n_4 = 1.93429$ | $\nu_4 = 18.9$ |
| $r_8 = -6.924$ | $d_8 = 1.07$ | | |
| $r_9 = \infty$ | $d_9 = 0.9$ | $n_5 = 1.51825$ | $\nu_5 = 64.14$ |
| $r_{10} = \infty$ | $d_{10} = 0.9$ | $n_6 = 1.61379$ | $\nu_6 = 50.2$ |
| $r_{11} = \infty$ | $d_{11} = 0$ | | |

Figure 14:
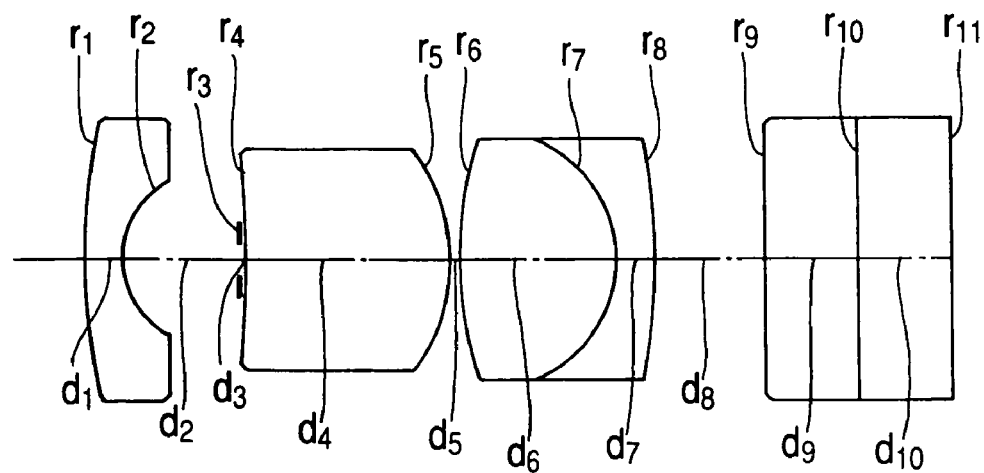
FIG. 14 is a sectional view of an objective optical system according to an eighth embodiment of the present invention.
Figure 15:
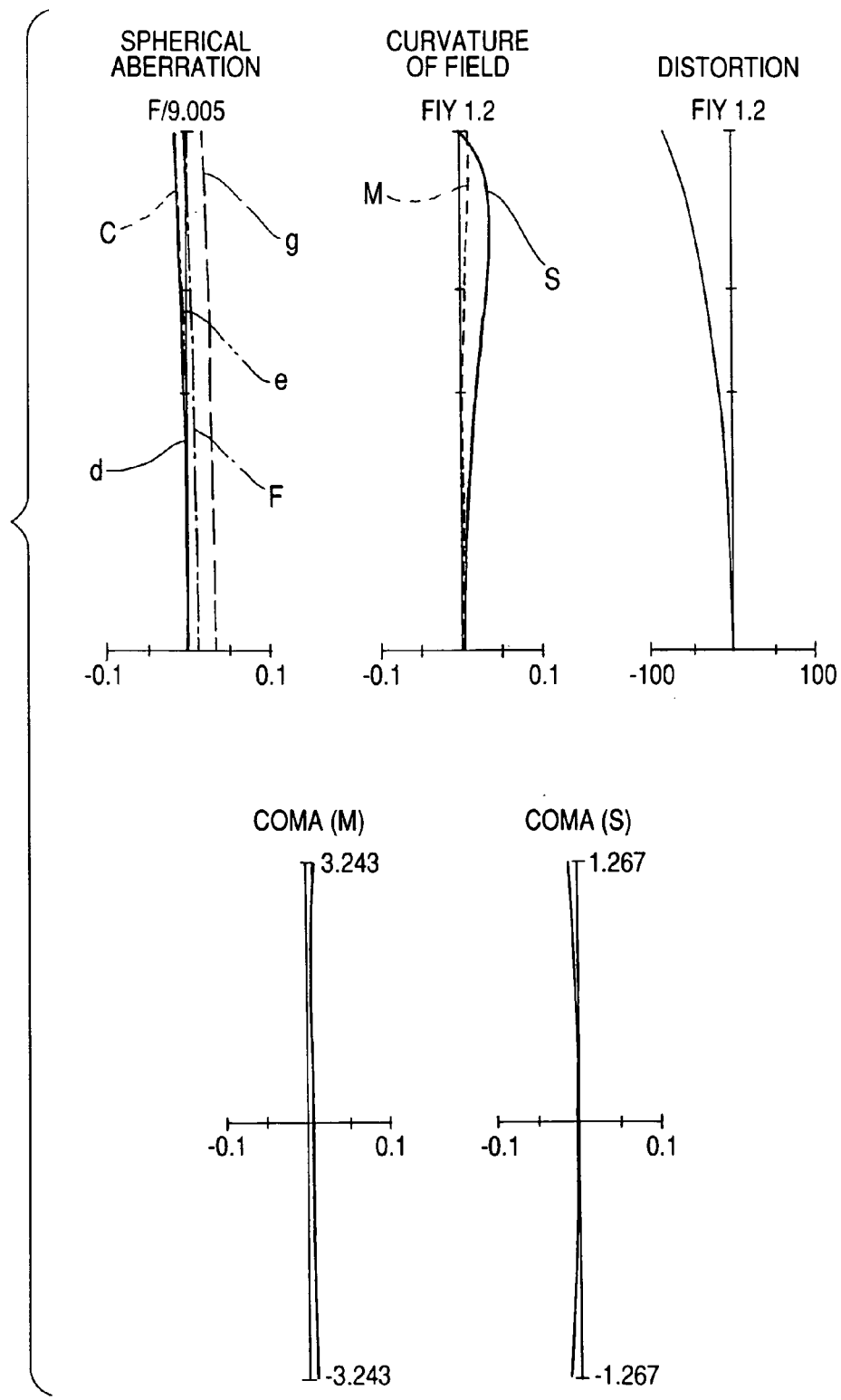
FIG. 15 shows aberration curves of the first embodiment.
Figure 16:
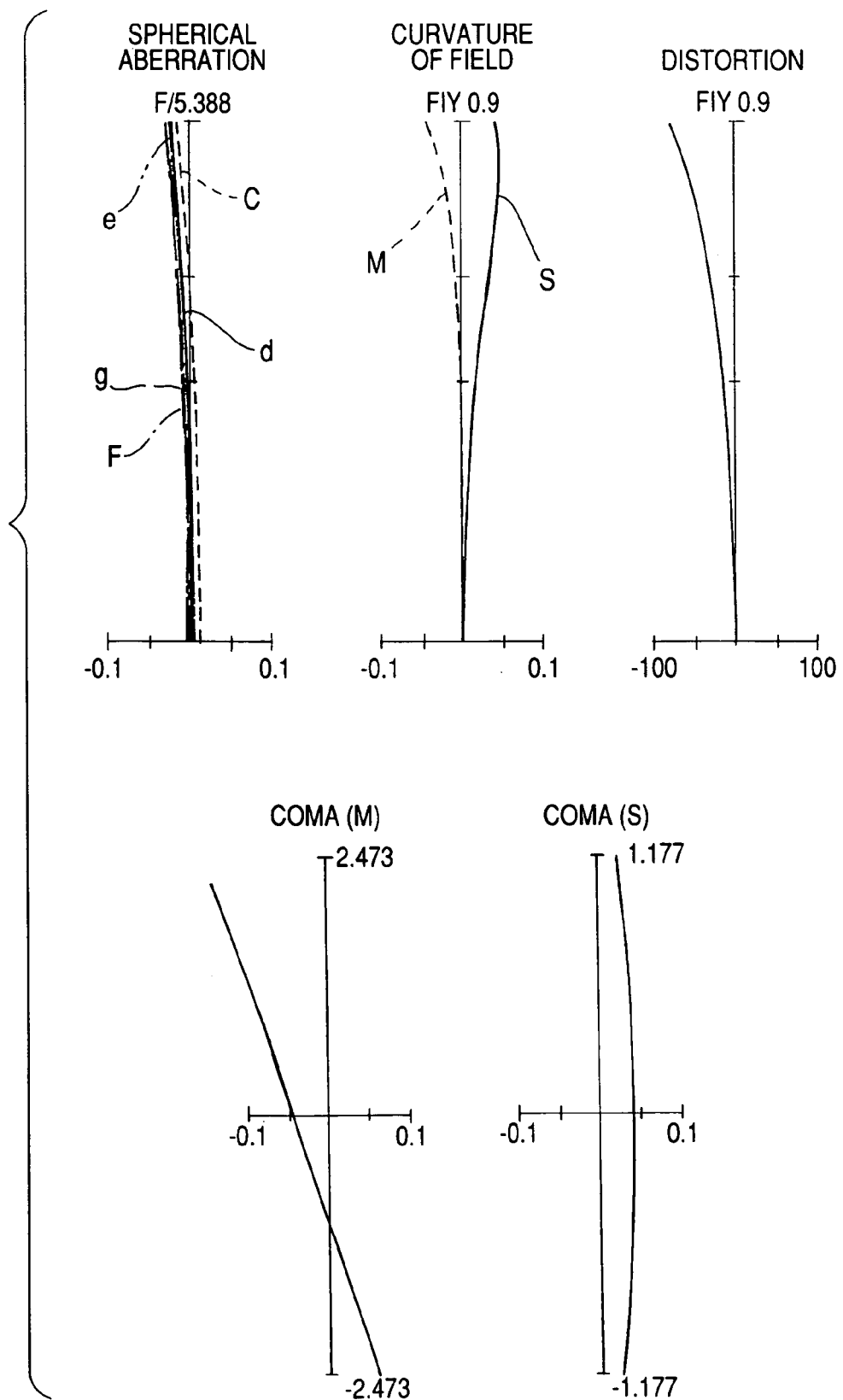
FIG. 16 shows aberration curves of the second embodiment.
Figure 17:
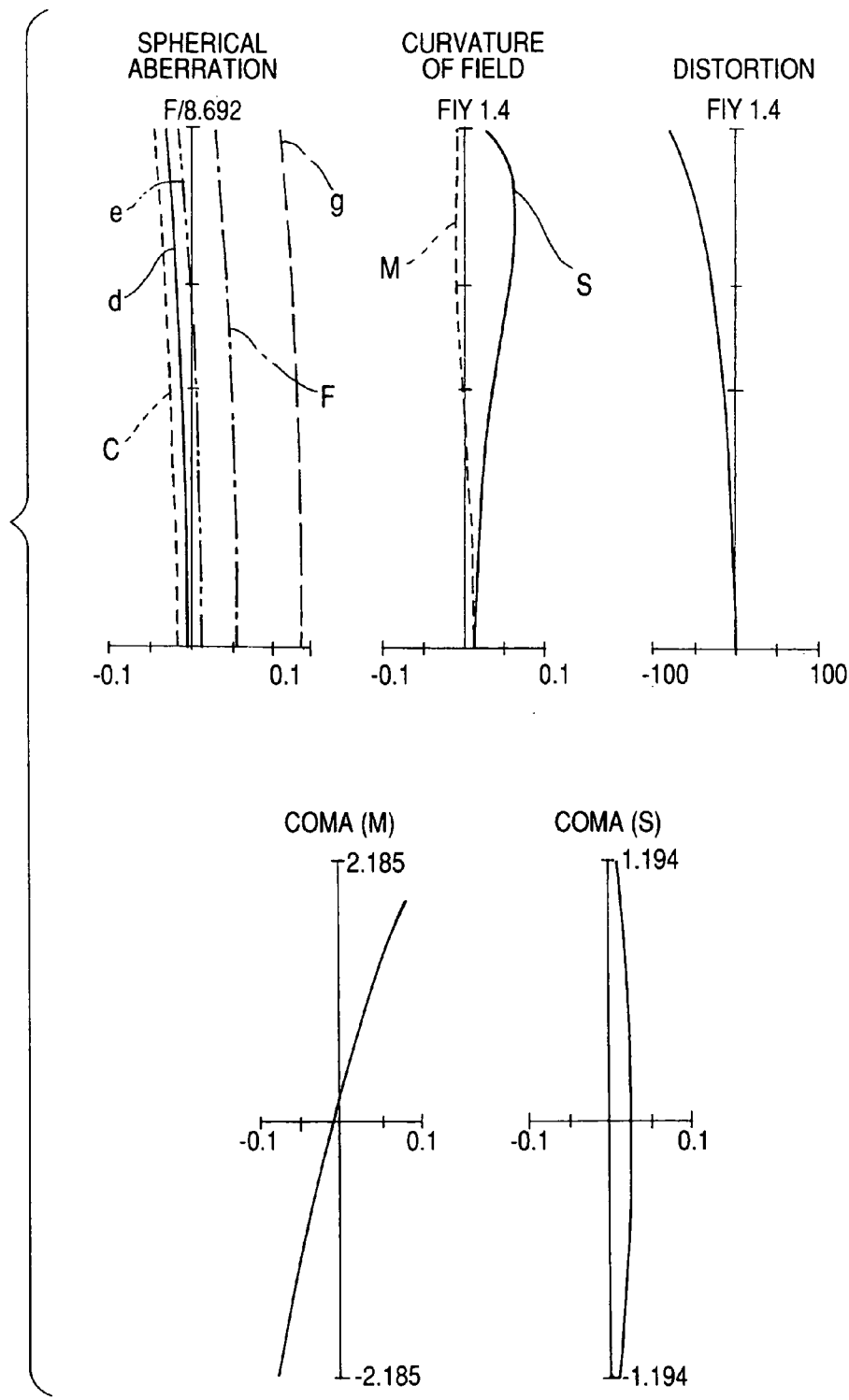
FIG. 17 shows aberration curves of the third embodiment.
Figure 18:
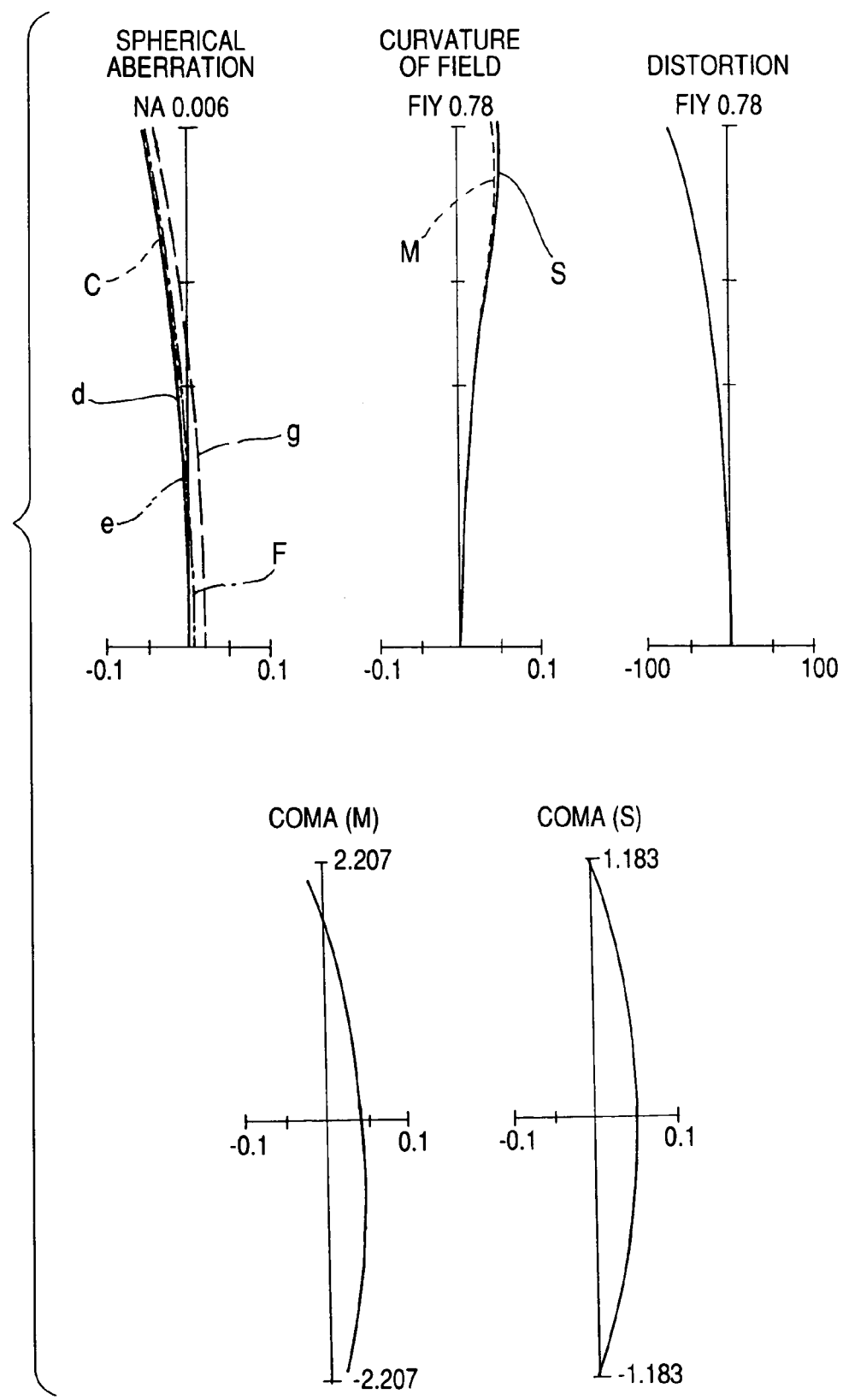
FIG. 18 shows aberration curves of the fourth embodiment.
Figure 19:
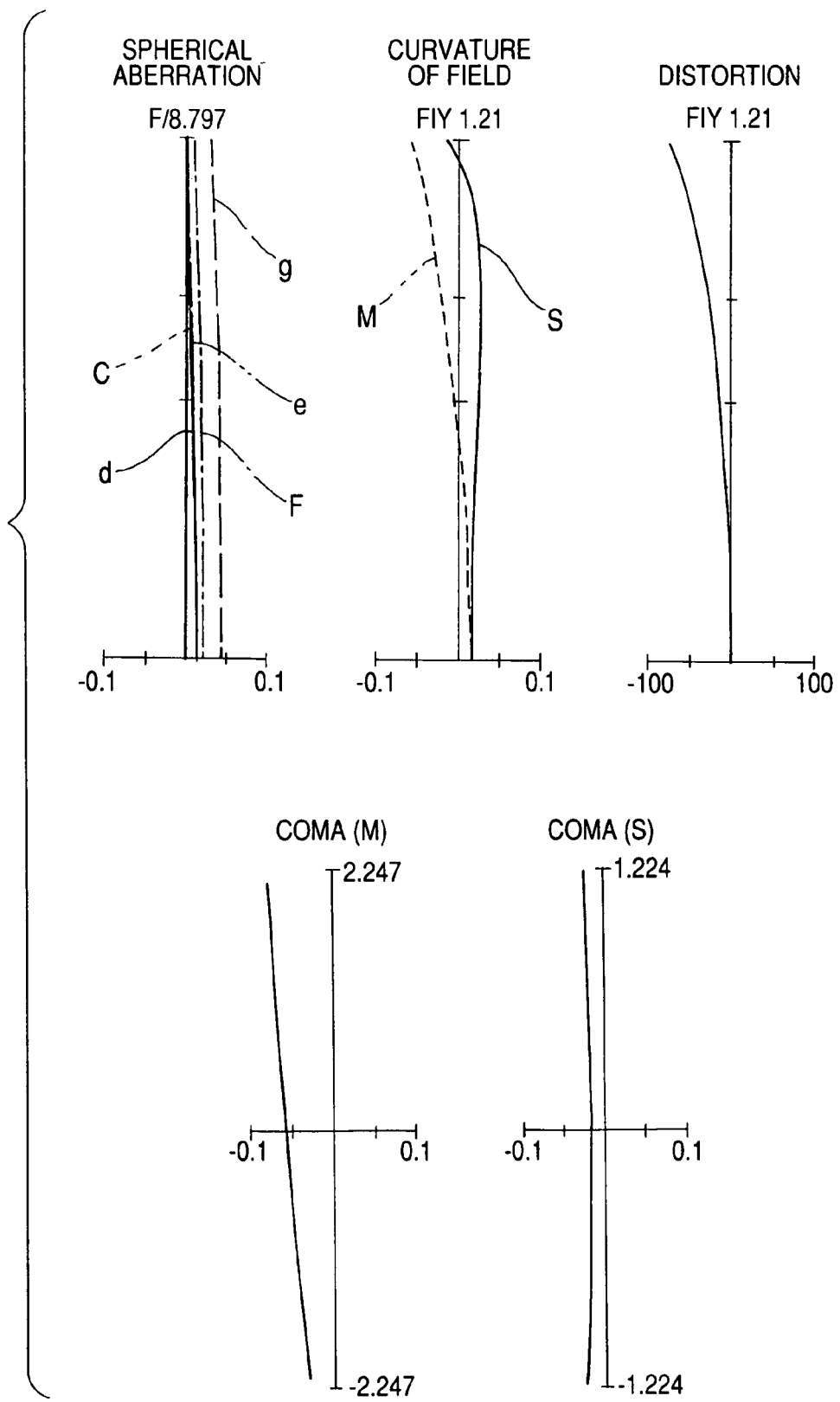
FIG. 19 shows aberration curves of the fifth embodiment.
Figure 20:
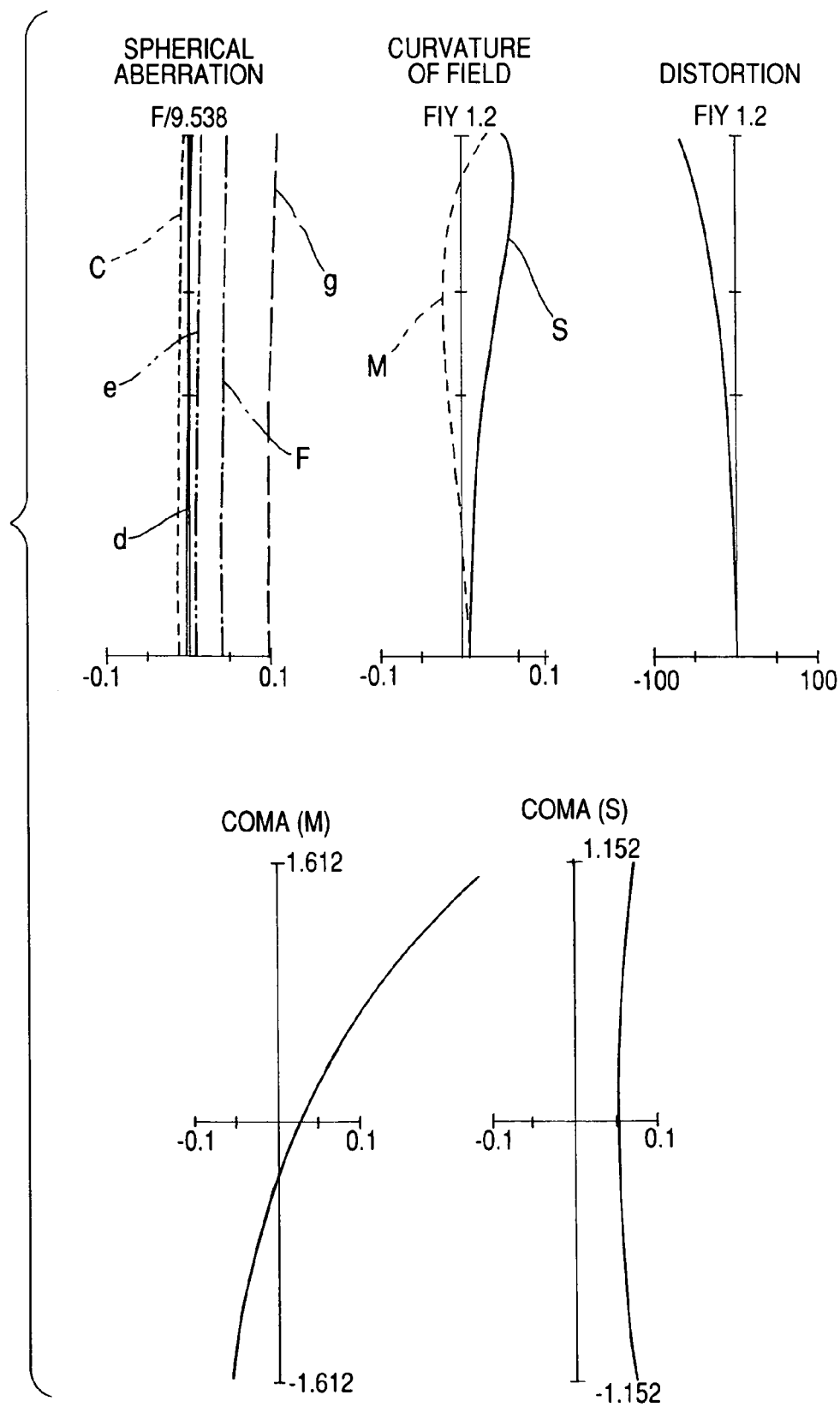
FIG. 20 shows aberration curves of the sixth embodiment.
Figure 21:
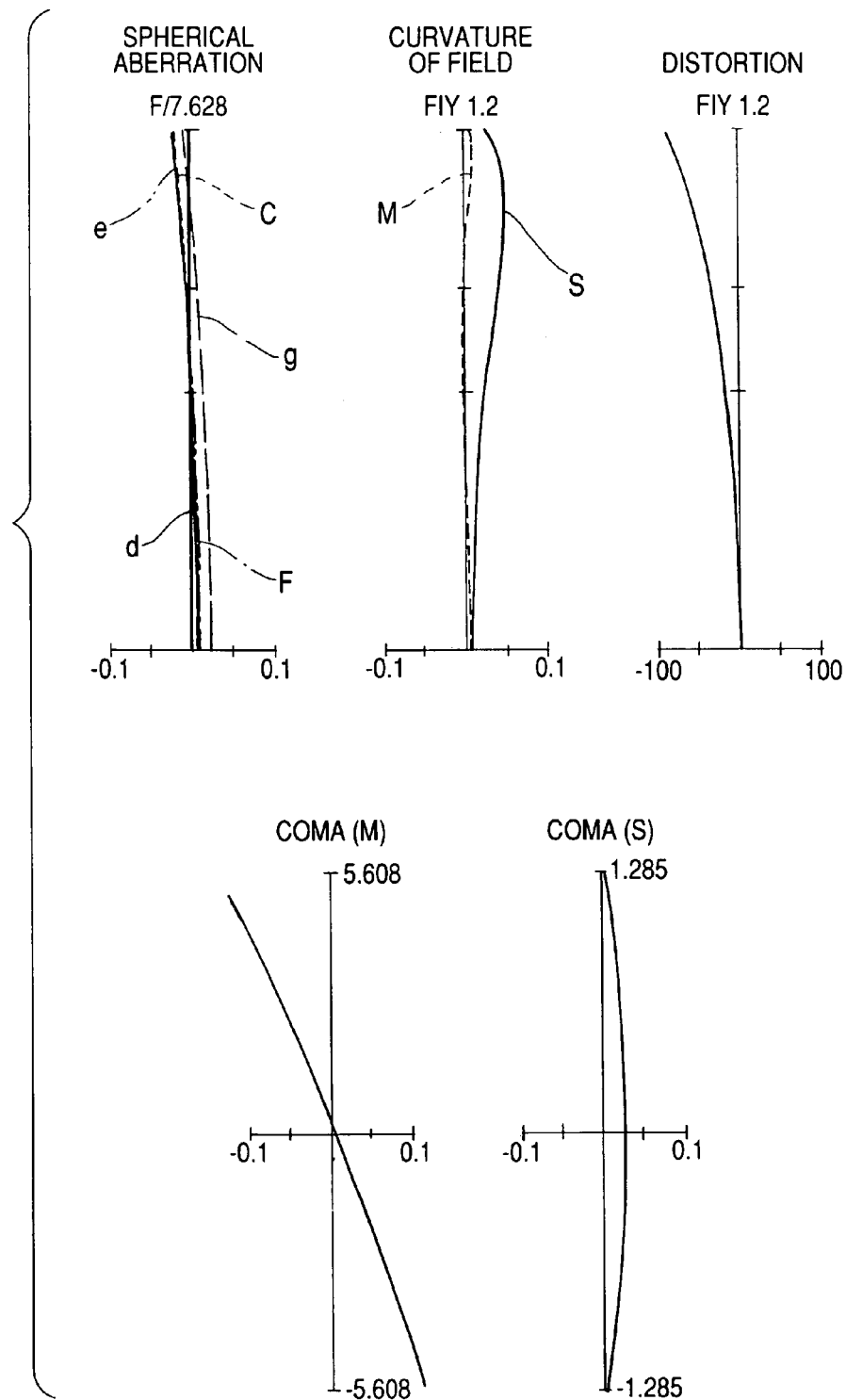
FIG. 21 shows aberration curves of the seventh embodiment.
Figure 22:
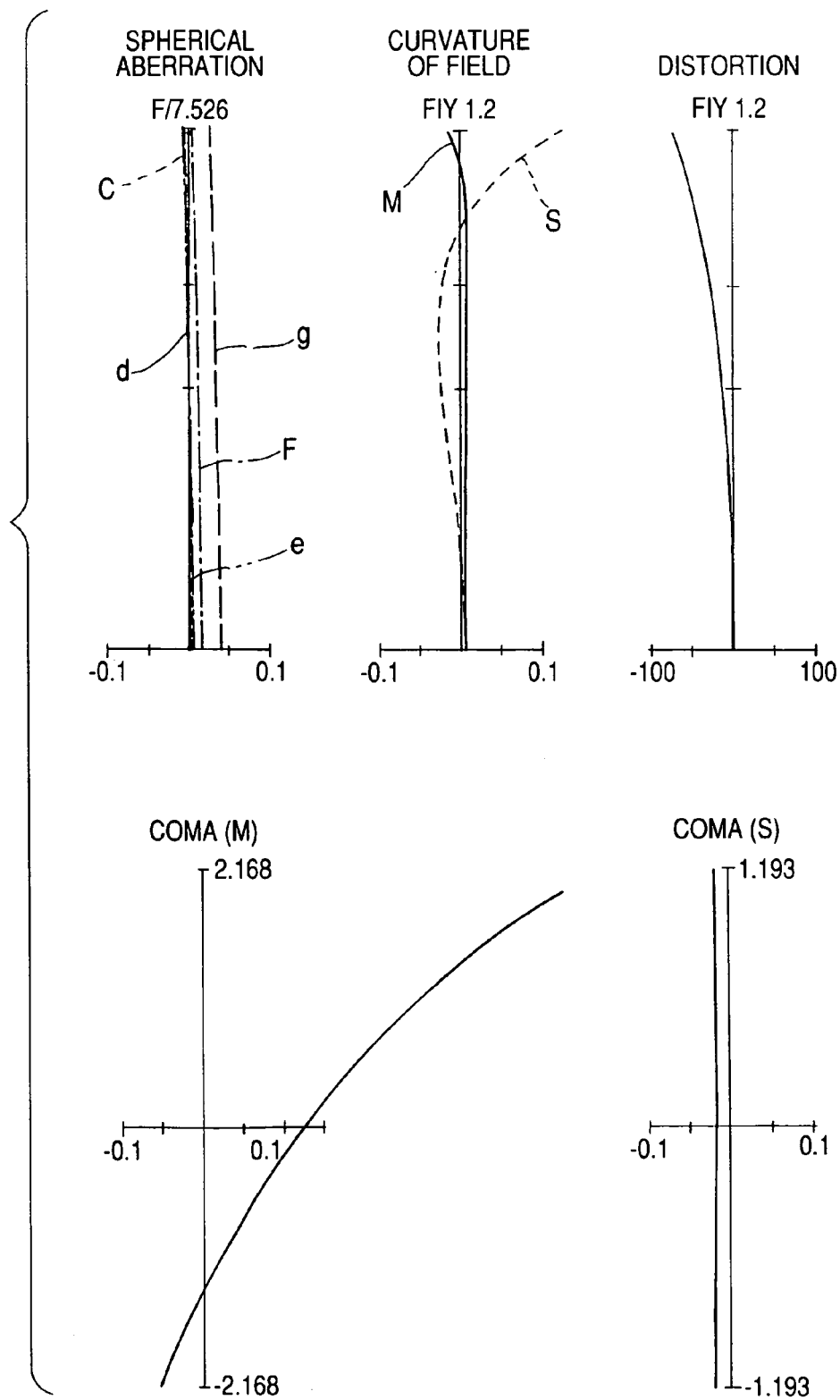
FIG. 22 shows aberration curves of the eighth embodiment.

The image pickup unit according to the eighth embodiment has a composition in which an objective optical system which consists of a first lens unit composed of a meniscus lens element ($r_1$ to $r_2$) having a convex surface on the object side, a second lens unit composed of a positive meniscus lens element ($r_4$ to $r_5$) having a convex surface on the image side and having positive refractive power as a whole and a cemented lens consisting of a biconvex lens element ($r_6$ to $r_7$) and a negative meniscus lens element ($r_7$ to $r_8$) and having positive refractive power as a whole, and an aperture stop disposed between the first lens unit and the second lens unit is combined, as shown in FIG. 14, with a solid-state image pickup device which generates a luminance signal for each picture element.

Furthermore, a plane parallel plate ($r_{10}$ to $r_{11}$) which is disposed on the most image side is a cover glass plate having an image side surface to which the solid-state image pickup device is cemented and a plane parallel plate ($r_9$ to $r_{10}$) which is disposed on the object side of the cover glass plate is a cover glass plate for protecting the solid-state image pickup device.

The image pickup unit according to the eighth embodiment also corresponds to each of the first through the third compositions according to the present invention and therefore satisfies the conditions (1), (2), (3), (4), (5) and (6).

Furthermore, the image pickup unit according to the eighth embodiment uses the solid state image pickup device which generates the luminance signal for each picture element. This image pickup unit therefore satisfies the conditions (10), (11) and (12) as apparent from Table 1.

Furthermore, the image pickup unit according to the eighth embodiment has not only a short equivalent air distance through the first lens unit to the second lens unit of the objective optical system but also a short total length and a short outside diameter of the objective optical system, whereby this image pickup unit is compact.

The following table lists values of the terms used in the conditions which are adopted for the above described embodiments:

TABLE 1

| | Embodiment 1 | Embodiment 2 | Embodiment 3 | Embodiment 4 |
|---|---|---|---|---|
| f/IH | 0.838 | 0.870 | 0.878 | 0.867 |
| fI/f | −1.096 | −1.015 | −0.826 | −1.149 |
| D/|fI| | 1.436 | 1.211 | 1.627 | 1.120 |
| r1/f | 7.097 | 7.598 | 8.461 | 7.769 |
| LH/IH | 0.966 | 0.963 | 0.742 | 0.957 |
| IH2/IH1 | 0.737 | 0.740 | 0.751 | 0.735 |

TABLE 1-continued

| | | | | |
|---|---|---|---|---|
| W/P | 880 | 516 | 741 | 379 |
| f/P | 402 | 261 | 362 | 166 |
| Fno./p | 3695 | 1813 | 2624 | 1773 |
| ΔDT | −10.429 | −10.437 | −11.417 | −10.338 |

| | Embodiment 5 | Embodiment 6 | Embodiment 7 | Embodiment 8 |
|---|---|---|---|---|
| f/IH | 0.868 | 0.925 | 0.781 | 0.868 |
| f1/f | −1.194 | −0.797 | −1.060 | −1.119 |
| D/\|f1\| | 1.175 | 1.325 | 1.228 | 0.970 |
| r1/f | 7.978 | 11.894 | 4.738 | 6.720 |
| LH/IH | 0.865 | 0.751 | 0.997 | 0.904 |
| IH2/IH1 | 0.742 | 0.759 | 0.715 | 0.737 |
| W/P | 684 | 530 | 754 | 560 |
| f/P | 349 | 278 | 335 | 289 |
| Fno./p | 3017 | 2448 | 2758 | 2136 |
| ΔDT | −10.795 | −11.977 | −9.119 | −10.371 |

In addition, aberration conditions in the above descried first through eighth embodiments are illustrated in FIG. 15 through FIG. 22.

The invention claimed is:

1. An image pickup unit for endoscope consisting of an objective optical system and a solid-state image pickup device, and having a maximum field angle of 150° or larger, wherein said objective optical system is composed of spherical lens elements and plane parallel plates, and consists of a first lens unit which comprises a first meniscus lens element having a convex surface on the object side and having negative refractive power and has negative refractive power as a whole, a second lens unit which comprises at least a convex lens element and has positive refractive power as a whole and an aperture stop which is disposed between the first lens unit and the second lens unit, and satisfies the following conditions (1), (2) and (3):

$$0.7 < f/IH < 1 \quad (1)$$

$$-1.2 < f1/f < -0.7 \quad (2)$$

$$0.9 < D/|f1| < 1.8 \quad (3)$$

wherein a reference symbol f represents a focal length of the objective optical system, a reference symbol IH designates a maximum image height in a display area of the solid-state image pickup device, a reference symbol f1 denotes a focal length of the first lens unit and a reference symbol D represents an equivalent air distance as measured along an optical axis from an image side surface of the first lens element in the first lens unit to the aperture stop.

2. The image pickup unit for endoscope according to claim 1,
wherein said solid state image pickup device is a color solid-state image pickup device on which a color filter is arranged for each picture element and which satisfies the following condition (7):

$$W/p > 500 \quad (7)$$

wherein a reference symbol W represents a horizontal length of an effective image pickup area of the solid-state image pickup device and a reference symbol p designates a horizontal pitch of picture elements in the effective image pickup area of the solid-state image pickup device.

3. The image pickup unit for endoscope according to claim 2, satisfying the following conditions (8) and (9):

$$240 < f/p < 480 \quad (8)$$

$$2400 \times p < Fno. < 4200 \times p \quad (9)$$

wherein a reference symbol Fno. denotes an F number of the objective optical system.

4. The image pickup unit for endoscope according to claim 1,
wherein said solid-state image pickup device is a solid-state image pickup device which generates a luminance signal for each picture element and satisfies the following condition (10):

$$W/p > 340 \quad (10)$$

wherein a reference symbol W represents a horizontal length of an effective image pickup area of the solid-state image pickup device and a reference symbol p designates a horizontal pitch of picture elements in the effective image pickup area of the solid-state image pickup device.

5. The image pickup unit for endoscope according to claim 4, satisfying the following conditions (11) and (12):

$$160 < f/p < 320 \quad (11)$$

$$1600 \times p < Fno. < 2800 \times p \quad (12)$$

wherein a reference symbol Fno. denotes an F number of the objective optical system.

6. The image pickup unit for endoscope according to claim 1,
wherein the first lens element which is disposed on the most object side in the optical system is made of a material which has a refractive index of 2.0 or higher for the e-line.

7. An image pickup unit for endoscope consisting of an objective optical system and a solid state image pickup device, and having a maximum field angle of 150° or larger, wherein said objective optical system is composed of spherical lens elements and plane parallel plates, and satisfies the following conditions (4) and (5):

$$4f < r_1 < 12f \quad (4)$$

$$|LH| \leq IH \quad (5)$$

wherein a reference symbol f represents a focal length of the objective optical system, a reference symbol $r_1$ designates a radius of curvature on a most object side surface of a first lens element, a reference symbol IH designates a maximum image height in a display area of the solid state image pickup device, and a reference symbol LH denotes a distance from a principal ray to be incident at said maximum image height to an optical axis on the most object side surface.

8. The image pickup unit for endoscope according to claim 7,
wherein said solid-state image pickup device is a color solid-state image pickup device on which a color filter is arranged for each picture element and which satisfies the following condition (7):

$$W/p > 500 \quad (7)$$

wherein a reference symbol W represents a horizontal length of an effective image pickup area of the solid-state image pickup device and a reference symbol p designates a horizontal pitch of picture elements in the effective image pickup area of the solid-state image pickup device.

9. The image pickup unit for endoscope according to claim 8, satisfying the following conditions (8) and (9):

$$240 < f/p < 480 \quad (8)$$

$$2400 \times p < Fno. < 4200 \times p \quad (9)$$

wherein a reference symbol Fno. denotes an F number of the objective optical system.

10. The image pickup unit for endoscope according to claim 7,
wherein said solid-state image pickup device is a solid-state image pickup device which generates a luminance signal for each picture element and satisfies the following condition (10):

$$W/p > 340 \quad (10)$$

wherein a reference symbol W represents a horizontal length of an effective image pickup area of the solid-state image pickup device and a reference symbol p designates a horizontal pitch of picture elements in the effective image pickup area of the solid-state image pickup device.

11. The image pickup unit for endoscope according to claim 10, satisfying the following conditions (11) and (12):

$$160 < f/p < 320 \quad (11)$$

$$1600 \times p < Fno. < 2800 \times p \quad (12)$$

wherein a reference symbols Fno. denotes an F number of the objective optical system.

12. The image pickup unit for endoscope according to claim 7,
wherein a first lens element which is disposed on the most object side in the optical system is made of a material which has a refractive index of 2.0 or higher for the e-line.

13. An image pickup unit for endoscope consisting of an objective optical system and a solid-state image pickup device, having a maximum field angle of 150° or larger and satisfying the following condition (6):

$$0.68 < IH2/IH1 < 0.76 \quad (6)$$

wherein a reference symbol IH1 represents an image height of a ray which is incident on the objective optical system in a direction of 75° relative to an optical axis and a reference symbol IH2 designates an image height of a ray which is incident on the objective optical system in a direction of 50° relative to the optical axis.

14. The image pickup unit for endoscope according to claim 13,
wherein said solid-state image pickup device is a color solid-state image pickup device on which a color filter is arranged for each picture element and which satisfies the following condition (7):

$$W/p > 500 \quad (7)$$

wherein a reference symbol W represents a horizontal length of an effective image pickup area of the solid-state image pickup device and a reference symbol p designates a horizontal pitch of picture elements in the effective image pickup area of the solid-state image pickup device.

15. The image pickup unit for endoscope according to claim 14, satisfying the following conditions (8) and (9):

$$240 < f/p < 480 \quad (8)$$

$$2400 \times p < Fno. < 4200 \times p \quad (9)$$

wherein a reference symbol f represents a focal length of the objective optical system, and a reference symbol Fno. denotes an F number of the objective optical system.

16. The image pickup unit for endoscope according to claim 13,
wherein said solid-state image pickup device is a solid-state image pickup device which generates a luminance signal for each picture element and satisfies the following condition (10):

$$W/p > 340 \quad (10)$$

wherein a reference symbol W represents a horizontal length of an effective image pickup area of the solid-state image pickup device and a reference symbol p denotes a horizontal pitch of picture elements in the effective image pickup area of the solid-state image pickup device.

17. The image pickup unit for endoscope according to claim 16, satisfying the following conditions (11) and (12):

$$160 < f/p < 320 \quad (11)$$

$$1600 \times p < Fno. < 2800 \times p \quad (12)$$

wherein a reference symbol f represents a focal length of the objective optical system, and a reference symbol Fno. denotes an F number of the objective optical system.

18. The image pickup unit for endoscope according to claim 13,
wherein a first lens element which is disposed on the most object side in the optical system is made of a material which has a refractive index of 2.0 or higher for the e-line.

* * * * *